(12) United States Patent
Jin et al.

(10) Patent No.: US 12,504,980 B2
(45) Date of Patent: Dec. 23, 2025

(54) PERSONALIZED RECOMMENDER SYSTEM FOR INFORMATION VISUALIZATION

(71) Applicant: VIRGINIA TECH INTELLECTUAL PROPERTIES, INC., Blacksburg, VA (US)

(72) Inventors: Ran Jin, Blacksburg, VA (US); Xiaoyu Chen, Blacksburg, VA (US); Nathan Lau, Blacksburg, VA (US)

(73) Assignee: VIRGINIA TECH INTELLECTUAL PROPERTIES, INC., Blacksburg, VA (US)

(*) Notice: Subject to any disclaimer, the term of this patent is extended or adjusted under 35 U.S.C. 154(b) by 35 days.

(21) Appl. No.: 18/264,675

(22) PCT Filed: Feb. 8, 2022

(86) PCT No.: PCT/US2022/070564
§ 371 (c)(1),
(2) Date: Aug. 8, 2023

(87) PCT Pub. No.: WO2022/170366
PCT Pub. Date: Aug. 11, 2022

(65) Prior Publication Data
US 2024/0143348 A1    May 2, 2024

Related U.S. Application Data

(60) Provisional application No. 63/146,822, filed on Feb. 8, 2021.

(51) Int. Cl.
*G06F 17/16* (2006.01)
*G02B 27/00* (2006.01)
*G06F 9/451* (2018.01)

(52) U.S. Cl.
CPC ......... *G06F 9/451* (2018.02); *G02B 27/0093* (2013.01); *G06F 17/16* (2013.01)

(58) Field of Classification Search
None
See application file for complete search history.

(56) References Cited

U.S. PATENT DOCUMENTS 9,406,024 B1 *   8/2016   Gordon ............... G06N 5/04
2003/0046401 A1 *  3/2003   Abbott ............... G06F 9/451
                                                709/227

(Continued)

OTHER PUBLICATIONS

International Search Report and Written Opinion for PCT/US2022/070564 mailed Apr. 14, 2022.

*Primary Examiner* — Tuyetlien T Tran
(74) *Attorney, Agent, or Firm* — Perilla Knox & Hildebrandt LLP; Jason M. Perilla

(57) ABSTRACT

Adapting user interface designs for specific tasks performed by different users is a challenging yet important problem. Automatically adapting visualization designs to users and contexts (e.g., tasks, display devices, environments, etc.) can theoretically improve human-computer interaction to acquire insights from complex datasets. However, effectiveness of any specific visualization is moderated by individual differences in knowledge, skills, and abilities for different contexts. A modeling framework called Personalized Recommender System for Information visualization Methods via Extended matrix completion (PRIME) is described for recommending the optimal visualization designs for individual users in different contexts.

20 Claims, 9 Drawing Sheets

(56) References Cited

U.S. PATENT DOCUMENTS

| | | | | |
|---|---|---|---|---|
| 2010/0280985 | A1* | 11/2010 | Duchon | G06Q 10/10 |
| | | | | 706/54 |
| 2015/0178378 | A1* | 6/2015 | Hellstrom | G06F 16/9535 |
| | | | | 706/14 |
| 2015/0261293 | A1* | 9/2015 | Wilairat | G06F 3/013 |
| | | | | 345/156 |
| 2016/0026925 | A1* | 1/2016 | Bouchard | G06N 20/00 |
| | | | | 706/12 |
| 2018/0046470 | A1* | 2/2018 | de Oliveira | G06F 16/438 |
| 2019/0207814 | A1* | 7/2019 | Jain | H04L 41/0853 |
| 2019/0355346 | A1* | 11/2019 | Bellegarda | G06F 40/216 |
| 2019/0370650 | A1* | 12/2019 | Wheeler | A61F 2/72 |
| 2020/0097340 | A1* | 3/2020 | Balik | G06F 9/542 |
| 2020/0226418 | A1* | 7/2020 | Dorai-Raj | G06F 16/313 |
| 2020/0322815 | A1* | 10/2020 | Savalle | H04W 64/003 |
| 2021/0124597 | A1* | 4/2021 | Ramakrishnan | G06N 20/00 |
| 2021/0272217 | A1* | 9/2021 | Shu | G06F 18/2136 |
| 2022/0012022 | A1* | 1/2022 | Schwartz | G06N 3/082 |
| 2022/0101033 | A1* | 3/2022 | Hu | G06F 3/04842 |
| 2022/0101608 | A1* | 3/2022 | Hu | H04N 5/272 |
| 2022/0198256 | A1* | 6/2022 | Makhija | G06Q 10/0635 |

\* cited by examiner

PERSONALIZED RECOMMENDER SYSTEM FOR INFORMATION VISUALIZATION

CROSS REFERENCE TO RELATED APPLICATIONS

This application claims the benefit of, and priority to, U.S. Provisional Patent Application No. 63/146,822, entitled "Personalized Recommender System for Information Visualization," filed on Feb. 8, 2021, which is incorporated herein by reference in its entirety.

BACKGROUND

Adapting user interfaces to specific contexts (e.g., tasks, display devices, environments, etc.) for different users is a challenging yet important problem in intelligent user interface design. Traditional hypothesis testing in user studies is effective for identifying user interface design principles but not directly applicable to adapting the design to new users and contexts with limited or no historical data. Accordingly, improved systems and improved methods for addressing this adaptive user interface challenge to improve effectiveness and efficiency of human-machine interaction for acquiring insights of complex datasets through adaptive visualization is needed.

SUMMARY

Embodiments of the present disclosure are related to personalized recommender system for information visualization methods via extended matrix completion.

According one embodiment, among others, a method comprises receiving, via a computing device, a plurality of covariates associated with a plurality of users that have viewed a visualization design on a client device. A feature matrix is generated based at least in part on the plurality of covariates. A sparse response matrix is identified and the sparse response matrix represents the plurality of users and a plurality of contexts. The sparse response matrix comprises a plurality of unknown scores and a plurality of recommendation scores. The method comprises generating, via the computing device, an output of an alternating direction method of multipliers (ADMM) based at least in part on the sparse response matrix and the feature matrix. The output comprises a response matrix that includes a plurality of predicted recommendation scores for the plurality of unknown scores. A recommended item for a user is generated based at least in part on the plurality of recommendation scores and the predicted recommendation scores associated with the user in the response matrix.

According one embodiment, among others, a system comprises a sensor device, a computing device, and a memory to store a recommendation service. The recommendation service, when executed by the computing device, causes the computing device to receive the plurality of covariates from the sensor device and generate a feature matrix based at least in part on the plurality of covariates. A sparse response matrix is identified and the sparse response matrix represents a plurality of users and a plurality of visualization designs. The sparse response matrix comprises a plurality of unknown scores and a plurality of recommendation scores. An output of an alternating direction method of multipliers (ADMM) is generated based at least in part on the sparse response matrix and the feature matrix. The output comprises a response matrix that includes a plurality of predicted recommendation scores for the plurality of unknown scores. A recommended visualization design is generated for a user based at least in part on the plurality of recommendation scores and the predicted recommendation scores associated with the user in the response matrix.

According one embodiment, among others, a non-transitory computer-readable medium embodying a program executable in at least one computing device that, when executed by the at least one computing device, causes the at least one computing device to receive a plurality of covariates from a sensor device associated with a user and generate a feature matrix based at least in part on the plurality of covariates. A sparse response matrix is identified, and the response matrix represents a plurality of users and a plurality of visualization designs, the sparse response matrix comprising a plurality of unknown scores and a plurality of recommendation scores. An output of an alternating direction method of multipliers (ADMM) is generated based at least in part on the sparse response matrix and the feature matrix. The output comprises a response matrix that includes a plurality of predicted recommendation scores for the plurality of unknown scores. A recommended visualization design for a user is generated based at least in part on the plurality of recommendation scores and the predicted recommendation scores associated with the user in the response matrix.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
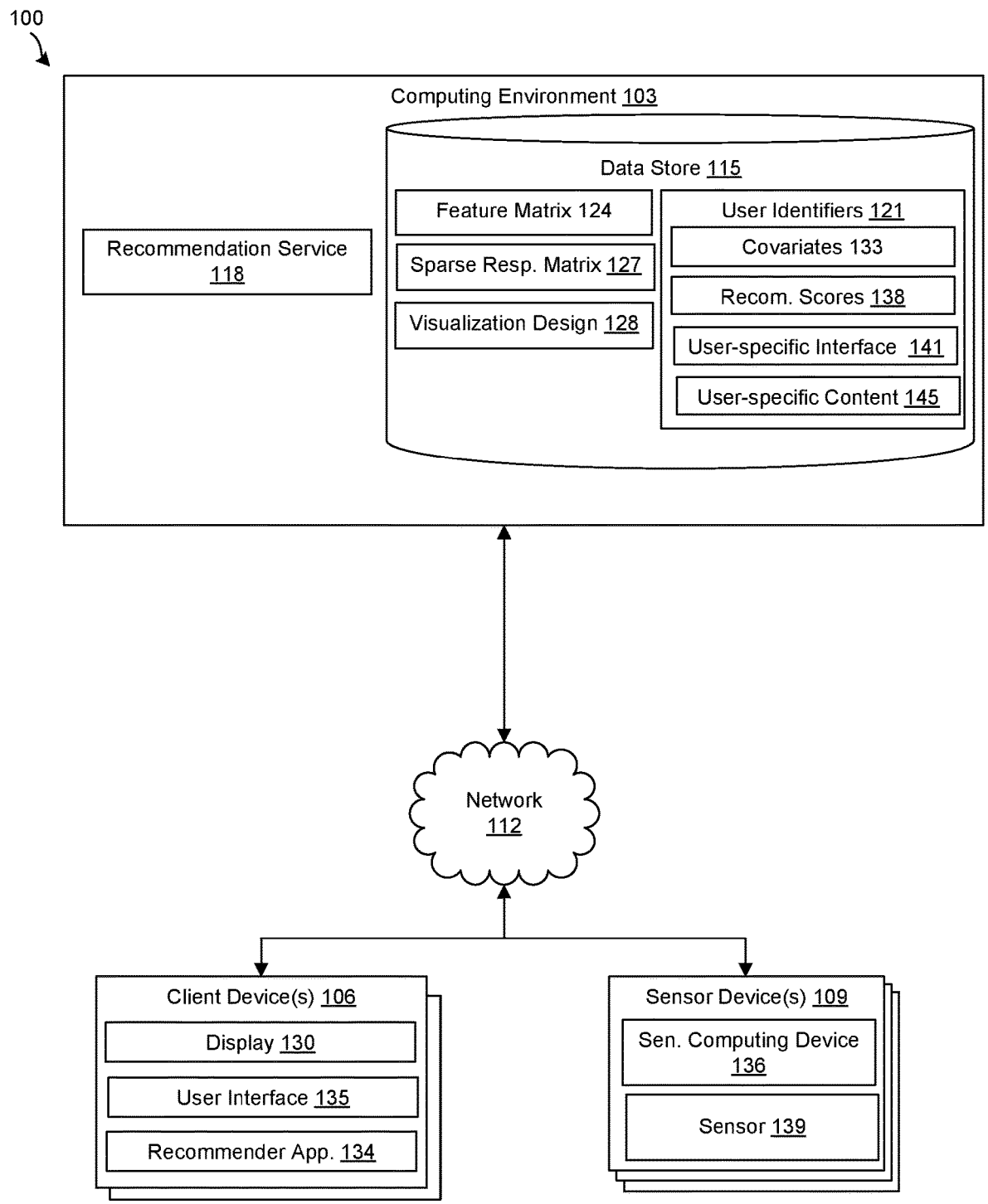
FIG. 1A is networked environment according to various embodiments of the present disclosure.

The embodiments of the present disclosure relate to a personalized recommender system for information visualization methods via extended matrix completion. Adapting user interface designs for specific tasks performed by different users is a challenging yet important problem. Automatically adapting visualization designs to users and contexts (e.g., tasks, display devices, environments, etc.) can theoretically improve human-computer interaction to acquire insights from complex datasets. However, effectiveness of any specific visualization is moderated by individual differences in knowledge, skills, and abilities for different contexts. A modeling framework called Personalized Recommender System for Information Visualization Methods via Extended matrix completion (PRIME) is described for recommending the optimal visualization designs for individual users in different contexts. In the context of the present disclosure, PRIME can represent an application or service executed on one or more computing devices (e.g., a grid computing, a server, etc.). PRIME can quantitatively model covariates (e.g., psychological and behavioral measurements) to predict recommendation scores (e.g., perceived complexity, mental workload, etc.) for users to adapt the visualization specific to the context. An evaluation study was conducted and showed that PRIME can achieve satisfactory recommendation accuracy for adapting visualization, even when there are limited historical data. PRIME can make accurate recommendations even for new users or new tasks based on historical wearable sensor signals and recommendation scores. This capability contributes to designing a new generation of visualization systems that will adapt to users' states. PRIME can support researchers in reducing the sample size requirements to quantify individual differences, and practitioners in adapting visualizations according to user states and contexts.

Adapting user interfaces to specific contexts (e.g., tasks, display devices, environments, etc.) for different users is a challenging yet important problem in intelligent user interface design. Traditional hypothesis testing in user studies is effective for identifying user interface design principles but not directly applicable to adapting the design to new users and contexts with limited or no historical data. The embodiments of the present disclosure addresses this adaptive user interface challenge to improve effectiveness and efficiency of human-machine interaction for acquiring insights of complex datasets through adaptive visualization.

Information visualization techniques graphically represent structured and unstructured, static and dynamic data sets of high dimensionality to support humans in gaining new knowledge in science and complex systems (e.g., smart manufacturing systems). Visualization helps direct attention to the most relevant portion of the datasets thereby enhancing insight generation. Many visualization techniques are available, but their ideal applications depend on contexts and individual differences (i.e., perception and cognition capabilities). Users face the challenge of choosing amongst various visualizations suitable for the tasks at hand. Therefore, alleviating the users from the burden of choosing the optimal visualization given the task and individual differences deserves research attention.

To aid users in selecting the optimal visualization, the embodiments of the present disclosure has considered the methodology of assessing the suitability of visualizations with respect to both individual differences and tasks of interests. There are many traditional techniques to evaluate visualizations, such as field observations, laboratory observations, usability tests, heuristics, and longitudinal studies. These evaluation techniques provide deep knowledge on visualizations and human computer interactions.

Research indicates that individual designs do not always affect all users in the same way due to individual differences. Individual differences include user perceptions, cognitive styles, visual and verbal working memories. These studies show that individual differences significantly mediate task performance measures, e.g., fault diagnosis accuracy. Thus, there could be benefits to personalizing visualizations based on user characteristics. Fast evaluation is necessary to support the personalized visualization as timely selection of visualization is essential. For example, some previous designs have included quantitative visualization evaluation models, which embedded a real-time variation analysis model on a hand-held and a head-mounted augmented reality (AR) platform to support timely decision making in advanced manufacturing. However, common measurements of individual differences as well as traditional visualization evaluation methods are not fast and thus cannot support visualization adaptive to both user and contextual characteristics.

Recent research studies on adaptive visualization are mainly conceptualized in terms of automated, user-adaptive, and recommender visualizations. Adaptive systems allocate functions, content, and schedule tasks by assessing system, situation, task, and human states. Automated visualization adapts to user input and interactions as well as contexts by automatically selecting informative data sets for visualization. Previous studies have successfully enhanced the users' comprehension of data sets by adapting the visualization design to contexts. However, previous designs have failed to personalize adaptive visualization in consideration of both users' states and contexts. The objective of the embodiments of the present disclosure is to innovate a recommender system that adapts information visualizations to individual differences and contexts automatically.

With reference to FIG. 1A, shown is a networked environment 100 according to various embodiments. The networked environment 100 includes a computing environment 103, a client device 106, and sensor devices 109, which are in data communication with each other via a network 112. The network 112 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed on the computing environment 103, for example, include a recommendation service 118, and other applications, services, processes, systems, engines, or functionality not discussed in detail herein. The recommendation service 118 is executed to optimize a user interface displayed on the client device 106 based on various factors associated with the user viewing the user interface. The recommendation service 118 can be executed to train machine learning models for optimizing the user interface displayed on the client device 106. In some embodiments, the machine learning models are deployed in the computing environment 103 and/or the client device 106.

The data stored in the data store 115 includes, for example, user identifier 121, a feature matrix 124, a sparse response matrix 127, visualization design 128, and potentially other data. The user identifiers 121 can represent a unique identifier for various individual users. Each user identifier 121 can represent a profile or user account for an individual user. For example, a user identifier 121 can be associated with covariates 133, recommendation scores 138, user-specific interface 141, user-specific content 145, and other suitable data.

The covariates 133 can represent characteristics associated with the user presently viewing a user interface on the client device 106. The characteristics can include physiological signals, a user state, and user input logs. The physiological signals (e.g., heart rate, eye movement, head movement, brain activity, oxygen levels, etc.) can be collected from sensor devices 109 or the client device 106 itself. The user state can refer to a present state of being for the user.

The recommendation scores 138 can represent a score or rating for a user that is used to recommended user-specific interface 141, user-specific content 145, and other suitable data. For example, the recommendation score 138 can be used to select a user interface for display that is optimized for the user.

The user-specific interface 141 can represent a user interface that is optimized for the user. For example, the user-specific interface 141 can include a specific user interface layout for the user based on the recommendation score 138, the covariates 133, or other suitable data. As a non-limiting example, the specific user interface layout may be customized based on a user interface element placement, user interface placement, the size and shape of user interface elements.

The user-specific content 145 can represent content that is selected for display in the user interface. For example, certain user interface elements may be selected for display based on the recommendation score 138, the covariates 133, or other suitable data. For instance, a particular user interface dashboard may be selected or a particular user interface element may be selected. Thus, the content displayed in a user interface for a first user may be different than the content displayed for a second user.

The feature matrix 124 can represent a multiple dimensional matrix that is extracted from the covariates 133. The feature matrix 124 can include data that characterizes the covariates 133. The sparse response matrix 127 (e.g., a user item matrix) can represent data associated with a set of users, a set of context types associated with the set of users, a recommendation score 138 and other suitable data. The context type can refer one or more of the previous recommended visualization designs 128. As such, the sparse response matrix 127 can include recommendation scores 138 as entries for each user (e.g., who has a user identifier 121) for each visualization design 128. In some non-limiting examples, the sparse response matrix 127 can include one or more unknown entries because a user may not have a history with completing task, viewing a user interface, viewing a user interface element, and other aspects.

The visualization designs 128 can represent various user interface designs that are stored in the computing environment 103. Visualization deigns 128 that are stored can be represented in the sparse response matrix 127. In some embodiments, the sparse response matrix 127 can have a column for every visualization design 128. When a new visual design is shown in a display 130 of the client device 106, a new column can be added to the sparse response matrix 127. In some examples, a new visualization design 128 can refer to a user interface design that has not been recorded in the data store 115.

The client device 106 is representative of a plurality of client devices that may be coupled to the network 112. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display 130. The display 130 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as a recommender application 134 and/or other applications. The recommender application 134 can be in data communication with the recommendations service 118 in order to personalize the user interface 135 for a user. In some embodiments, the recommender application 134 can transmit the covariates 133 to the recommendation service 118 and the recommendation service 118 transmit in return a personalized user interface 135 (e.g., User-specific interface 141, User-specific content 145) based on the covariates 133 (e.g., recommendation scores 138). In this instance, the recommendation service 118 may use a trained machine learning model to provide the personal user interface 134. In other instances, the recommender application 134 can execute a deployed machine learning algorithm received from the recommendation service 118. In this instance, the recommender application 134 can receive the covariates 133 from one or more the sensor devices 109 and generate a personal user interface 135 based on the covariates 133 and the deployed machine learning model.

Additionally, the recommender application 134 may be executed in a client device 106, for example, to access network content served up by the computing environment 103 and/or other servers, thereby rendering a user interface 135 on the display 130. To this end, the recommender application 134 may comprise, for example, a browser, a dedicated application, etc., and the user interface 135 may comprise a network page, an application screen, etc. The client device 106 may be configured to execute applications beyond the recommender application 134 such as, for example, email applications, social networking applications, word processors, spreadsheets, and/or other applications.

The sensor devices 109 can represent one or more devices that can collect covariates 133 from one or more user. A sensor device can include a sensor computing device 136 and a sensor 139. The sensor devices 109 can provide the covariates 133 to the computing environment 103 and/or the client device 106. Some non-limiting examples of sensor devices 109 can include a camera, wearable devices (e.g., an electroencephalogram (EEG) device, an augmented reality and virtual reality headsets, eye trackers, fitness trackers, watches, ring devices, and armbands, etc.), and other suitable sensor devices 109. The sensor computing device 136 can include a processor, a memory, a data communication component, a display, and other suitable computing components. The sensor computing device 136 can execute a sensor application for collecting covariates 133 from a user. The sensor application can also report the covariates 133 to the client device 136 and/or the computing environment 103. The sensor 139 can include an optical element (e.g., for a camera), a sensing element (e.g., electroencephalography (EEG) sensor, a photodiode, a phototransistor, a pulse sensor, etc.) for measuring physiological signals from a user, a data entry device for measuring characteristic of user data entry (e.g., a computer keyboard, a computer mouse, etc.) and other suitable components.

User-adaptive visualization has been found to improve performance. Previous studies have correlated eye gaze and users' tasks as well as their cognitive abilities (i.e., perceptual speed, visual working memory, and verbal working memory). However, previous studies have only investigated static and common graphs, such as line charts, bar charts, and radar charts, thus the results of which may not generalize to complex, interactive visualizations with multiple primitives (i.e., graphics representing many dimensions of information concurrently). Further, to recommend appropriate visualization components according to user knowledge and contexts, previous designs have implemented a knowledge-assisted, context-aware recommender system, which aimed to suggest the best visualization components according to different datasets and tasks. However, this previous design did not consider users' states, thus cannot support personalized visualization (e.g., user interface 135, user-specific interface 141, user-specific content 145) to the specific individuals. Recommender systems (e.g., recommendation service 118, recommender application 134) should serve as an adaptation manager that dynamically adjusts complex and interactive visualizations considering both contexts and user characteristics.

1.2 Recommendation Systems and Cold-Start Problem
1.2.1 Recommender Systems

Next, a discussion of recommendation system and a cold-start problem are provided. In some cases, recommender systems suggest the most suitable products or services to users by modeling available or historical information about user preferences and interactions as well as the products or services. In literature, users' ratings (e.g., preferences, satisfactory levels, etc.) for different items are typically organized into a sparse response matrix 127 (also referred to as user-item matrix) with each row representing one user and each column representing one item (i.e., a product or service). This matrix is sparse since users may not have reviewed all items. Recommender systems can employ machine learning (ML) algorithms to support personalized recommendations by quantifying implicit similarity contained among users' ratings. Implicit similarity can refer to the proportion of similarity that is implicit but can be determined in user ratings. ML typically requires large sample sizes to achieve satisfactory recommendation accuracy, which may not be available in many practical cases. For recommendation models that require relatively small sample sizes, matrix completion, matrix factorization, and k-nearest-neighbor search are widely-adopted as unsupervised learning techniques for collaborative filtering. Matrix completion techniques use the mathematical low rank property of user rating matrix (i.e., low rank sparse response matrix) to model the implicit similarity among ratings reviewed by a group of users for a set of items (i.e., tasks in this research).

One basic assumption for collaborative filtering methods is that the sparse response matrix 127 is low-rank, which means similar users and similar items (e.g., content or user interface layouts) are assumed to result in similar ratings (i.e., low-rank structure). However, in a visualization system, due to the individual differences and limited sample size, the low-rank assumption may no longer be valid. For example, a 14×33 response matrix can be full-rank, which is discussed in Section 4. Therefore, by assuming that a low-rank structure is not directly observable but is concealed by individual differences, a latent low-rank matrix can be investigated, which can be decomposed from the full-rank sparse response matrix 127 to specifically quantify the implicit similarity among users' ratings.

Content-based filtering, another mainstream approach, can perfectly complement the aforementioned decomposition to serve as another decomposed component, which explains explicit similarities. In general, content-based filtering methods make recommendations based on the similarity among covariates 133 for users and items. For example, a linear regression can be used to directly predict users' ratings based on covariates 133, which do not require the existence of low-rank structure and can quantify the individual differences explicitly represented by covariates 133. However, content-based filtering methods, regardless of advantages of collaborative filtering methods, may result in unsatisfactory recommendation accuracy when limited information are provided by covariates 133. Thus, the decomposition of the sparse response matrix 127 can be incorporated into a hidden low-rank matrix (i.e., collaborative information) and a covariates-based linear regression term (content-based information). See Section 2 for an example formulation.

1.2.2 Cold-Start Problem in Visualization Recommended System

Next, a discussion of the cold-start problem in visualization recommended system is provided. Visualization recommender system (e.g., recommendation service 118, recommender application 134) aims to suggest visualizations accurately not only for existing users, but also for new users in new contexts (e.g., new tasks, new devices, etc.) to expand market share that in turn enhances the recommendation accuracy as more historical data is obtained from new users and contexts. However, most current approaches assume an unknown fraction of the users' ratings to be arbitrarily empty, which was also referred as warm-start problem. That is, the warm-start assumption identifies a common scenario when users have no ratings in some contexts. However, the warm-start assumption does not hold for new users and/or new contexts which is commonly known as the cold-start problem in recommender systems. The cold-start problem is involved with generating recommendations to novel users who have no preference on any items (e.g., visualization designs 128), or recommending items that no user of the community has seen yet. Specifically, the warm-start assumption is not satisfied when the sparse response matrix 127 has missing entries for entire rows or columns. That is, the new users have not explored any existing context, or the new contexts have not been explored by existing user, thus similarity information is missing. Theoretically, the cold-start problem forces typical matrix completion techniques to minimize the rank response matrix with zero entries for entire rows or columns resulting in meaningless recommendations for all the new users in all the new contexts. For example, a new user may be suggested to try every visualization designs according to a recommender system because the recommendation results are likely meaningless without any basis of user's preferences. In this case, the user likely spends more efforts in finding out the best visualization design.

Previous studies have investigated the cold-start problem, and some of these previous studies have presented a hybrid method which uses a combination of collaborative filtering and content-based approaches to handle new users. These methods significantly improved the recommendation accuracy and user experience in E-commerce. Other predictive models have been reported to mitigate the cold-start problem using the profiles of users and items in recommender system. However, these methods still rely on relatively large sample sizes (i.e., more than thousands of samples) or interviews, which may not be available in visualization recommender systems or other practical settings.

Decomposing the sparse response matrix 127 into collaborative information and content-based information can enable the recommender system to handle cold-start problem, in which missed collaborative information can be compensated by content-based information. Specifically, incorporating physiological signals from wearable sensors (e.g., EEG device, eye tracker, heart rate tracker, etc.) or other sensor devices 109 (e.g., camera, computer keyboard, computer mouse) on the users alleviates the cold-start problem by comparing explicit similarities between new users or contexts to users or contexts in historical data. Physiological signals can also be measured from a camera oriented at the user. Explicit similarity is the similarity between real-time sensor signals and historical signals that can be quantified by extracting and analyzing signal patterns.

1.3 Wearable Sensors in Quantifying User States

Sensor devices 109 can be used for quantifying user states. Wearable and remote sensors (e.g., sensor devices 109) of human physiology and behaviors are increasingly capable of supporting fast assessment of user experience, mental activities and performance. EEG signals have been successfully adopted to quantify user's mental workloads, stress, and fatigue. To extract information automatically from EEG signals, many computational techniques have been discussed, such as wavelet transformation, queuing network, Bayesian network, support vector machine, and deep neural networks. The recommendation accuracy is expected to be significantly improved for individual users by automatically quantifying users' states from EEG signals via computational techniques.

Eye movements analysis has also played an important role in understanding visual perception, search patterns, and mental workloads. Several ML analytical techniques have been applied in extracting information from eye movements, such as support vector machine for task intent prediction, linear model system to predict mental workload, and regularized linear regression model to predict perceived task complexity.

However, previous designs have failed to consider fusing available sensor signals together due to the high dimensionality challenge. A typical research paradigm for sensor signal analysis is to extract a limited number of features from a single or several sensors separately and perform statistical tests to examine the significant relationships between dependent variables and independent variables offline. These traditional offline approaches do not support the online analysis of multidimensional sensor signals and thus cannot support fast recommendation. Previous studies have illustrated that different sensor signals may indicate different aspects of users' status. Therefore, a joint analysis method that can automatically identify important covariates 133 given high user and task information dimensionalities should improve quantification of users' status and interpretability of the visualization recommender system.

1.4 Overview

Next, an overview discussion is provided. The embodiments of the present disclosure relate to a framework called Personalized Recommendation for Information visualization Methods via Extended matrix completion (PRIME) to build (e.g., train) ML models for recommender systems. The trained ML models can be executed by the recommendation service 118 and/or the recommender application 134. PRIME can enable recommend visualization designs 128 by using physiological measurements and user input logs, providing satisfactory results even for new users or new contexts. PRIME can extend previous matrix completion techniques by incorporating covariates 133 to efficiently predict user response and modifying unrealistic assumptions (i.e., assumptions of matrix completion). Therefore, PRIME can address the needs for personalized visualization recommendation by quantifying individual differences in real-time when the training dataset is relatively small.

2. PRIME

PRIME can represent a modeling framework which can be potentially deployed as a general recommender system for many adaptive systems. After defining the recommendation score 138 (e.g., perceived task complexity in the context of the present disclosure), one major assumption that can be satisfied in using PRIME to build (e.g., train a machine learning model for) a recommender system, is specifying and collecting the covariates (e.g., characteristics) from users (e.g., physiological signals and user input logs) of the adaptive systems.

2.1 PRIME Formulation

Next, a discussion of the formulation of PRIME is provided. To formulate the recommendation problem, a sparse response matrix 127 can be defined as $Y \in \mathbb{R}^{m \times n}$ where m is the number of users, n is the number of context types (e.g., task, visualization design, environmental condition, etc.); each row and each column correspond to a user and a type of context, respectively; and each entry of the sparse response matrix 127 is the recommendation score 138 (e.g., perceived task complexity, preference score, cognitive workload, etc.) for the corresponding context. This matrix is sparse because some of the entries (e.g., recommendation scores 138) are unknown before the users completing the tasks in contexts. By completing the sparse response matrix Y, the unknown recommendation scores 138 can be predicted without conducting any experiments or gathering usage data. PRIME can also incorporate information contained in covariates $X \in \mathbb{R}^{mn \times p}$, such as physiological signals and users' input logs. $X \in \mathbb{R}^{mn \times p}$ denotes the high dimensional feature matrix 124 extracted from covariates 133, and p is the number of features. Various feature extraction techniques (e.g., see Table 4.) can be used to generate the feature matrix 124 from the covariates 133. (see Section 3.2 for feature extraction details). Users' covariates X contains the information of users' states, which are expected to improve recommendation accuracy.

Recommendations adaptive to the users and the contexts involve (i) predicting the scores for sparse entries in the matrix Y, and (ii) suggesting the item with the highest score given a specific user in a specific context. Previous studies typically model the implicit similarity indirectly contained in Y among different non-sparse recommendation scores by using matrix completion methods. These previous studies investigated similarity in the users' subjective ratings but failed to consider users' states, thus cannot provide satisfactory recommendation accuracy especially for limited historical data, new users, or new contexts. Widely adopted linear regression models aim to find the relationship between covariates 133 and users' responses, which is essentially a quantification of explicit similarities contained in covariates X. However, quantifying the explicit similarities only may not be sufficient because subjective ratings (e.g., recommendation scores 138 in the present disclosure) are typically rated with some level of randomness which cannot be explained simply by covariates 133.

Therefore, PRIME is described to incorporate both implicit and explicit similarities contained in Y based on covariates X, so that recommendation scores can be accurately predicted by considering similarity in subjective ratings and users' states. From modeling perspective, PRIME can be considered with two assumptions: (i) the recommendation scores 138 can be decomposed into additive effects of implicit and explicit similarities; and (ii) the recommendation errors follow a zero-mean Gaussian distribution, and are identically and independently distributed (i.i.d.). PRIME is formulated as:

$$Y = R + \mathcal{A}(X\beta) + E, \quad (1)$$

where $R \in \mathbb{R}^{m \times n}$ is a low rank matrix reflecting the implicit similarities decomposed from Y among recommendation scores 138 of different users in performing different tasks; $\beta \in \mathbb{R}^{p \times 1}$ is a column vector of coefficients indicating the level of relationships between the covariates 133 and the recommendation scores 138 to represent explicit similarities decomposed from Y; $E \in \mathcal{A}^{m \times n}$ is the residual matrix in which entry $$e_{i,j} \stackrel{i.i.d.}{\sim} N(0, \sigma^2)$$

stands for the recommendation error, and $\mathcal{A}(\cdot)$ is a linear mapping operator from $\mathbb{R}^{mn \times 1}$ to $\mathbb{R}^{m \times n}$ to ensure the same dimension of R, $\mathcal{A}(X\beta)$, and E.

The response matrix Y is decomposed into three parts as shown in Equation (1)—the low-rank matrix R, the linear regression part $\mathcal{A}(X\beta)$, and the error matrix E. Therefore, this model can be interpreted as a decomposition of the response matrix. Namely, as graphically presented in FIG. 1B, it can be assumed that each recommendation score in response matrix Y can be predicted by using (i) implicit similarity among all recommendation scores represented as low-rank matrix R, (ii) explicit similarity among covariates 133 quantified by estimating linear regression coefficients β, and (iii) random recommendation errors which represent the randomness in subjective rating of recommendation scores. By decomposing the recommendation scores, PRIME can provide interpretability and thus supports diagnostics of its recommendations. For example, the lower the rank of R is, the higher the implicit similarities exist in Y. It can indicate that subjective ratings of recommendation scores are consistent for contexts among different users. The sparser the coefficient β vector is, the higher the explicit similarities exist in X. It can imply that users' states dominant their ratings of recommendation scores.

Figure 1B:
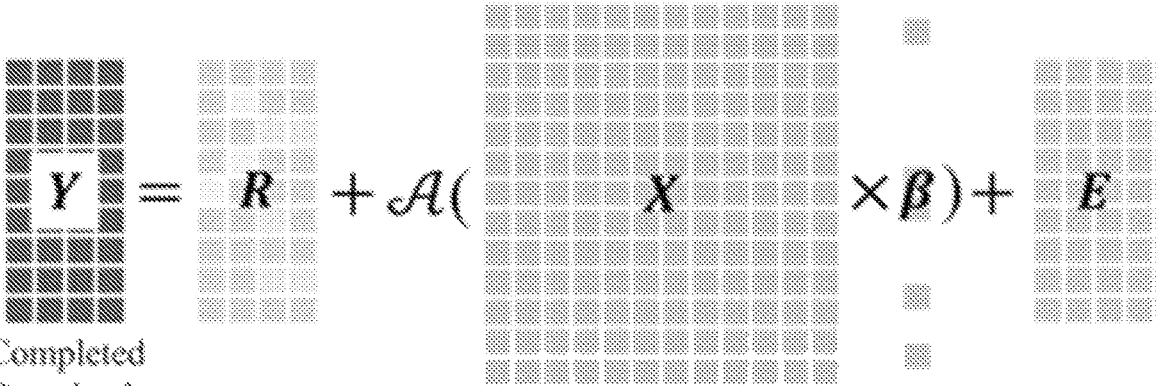
FIG. 1B is a graphical representation of a recommender system, according to one embodiment described herein.

With reference to FIG. 1B, shown is a graphical representation of PRIME, where the completed recommendation score matrix Y is decomposed into a low-rank matrix R, a linear regression term $\mathcal{A}(X\beta)$, and an error matrix E. Shapes of the matrices can represent dimensions. Specifically, the matrices in the same shapes can represent the same dimension m×n, while predictor matrix X has the dimension mn×p, and coefficient vector β has the dimension p×1. The low-rank property of R is represented by the yellow color coding, i.e., rows/columns are similar if colors are similar. The sparse coefficient vector β is represented by the sparsity of blue cells, which identify the significant predictors.

2.2 Interpretation of PRIME and PRIME for Cold-Start Problem

Next, a discussion of the interpretation of PRIME and PRIME for Cold-start problem is provided. Since the rank of a matrix quantifies the linear dependency between columns or rows, the matrix R can be forced to be low-rank in order to capture the similarity (i.e., linear dependency) among recommendation scores. Specifically, lower rank can indicate higher implicit similarities among recommendation scores. Higher implicit similarities can indicate that the recommendation accuracy may not be significantly influenced by individual differences, since the low-rank structure in R indicates consistency in users' ratings. The linear regression term $\mathcal{A}(X\beta)$ not only quantifies the explicit similarities measured by covariates 133 (i.e., sparsity of regression coefficient vector), but also automatically select significant covariates 133. For instance, sparser regression coefficient vector indicates higher level of explicit similarities contained in covariates 133. Higher explicit similarities can indicate that individual differences contribute to recommendation accuracy significantly, since the difference in selected covariates 133 significantly affect the recommendation scores. The coefficients can indicate the strengths of the relationship between the recommendation scores and the covariates 133. The covariates selection is enabled by regularizing the coefficients vector β using a L-1 norm to enforce the sparsity. Taking sparse response matrix Y and feature matrix X as input, PRIME can solve for the missing ratings in Y, which is used to recommend the best visualization to different users in performing different tasks, even for new users and new tasks without historical data.

A new user or a new task leads to a row or a column with no existing recommendation score in sparse response matrix Y. As a result, merely quantifying implicit similarities by enforcing the low-rank structure of matrix R cannot address the cold-start problem because minimizing the rank of R results in all-zero predicted scores for the empty row or column, which lead to meaningless recommendation results.

PRIME can resolve this issue by incorporating linear regression term $\mathcal{A}$ (X$\beta$) to quantify the explicit similarities among covariates 133, which can be estimated with questionnaire, interview, physiological, and behavioral data. Even without historical recommendation scores for a new user, the user's covariates 133 can be used to measure the similarities between the new user and other users in historical data set. Thus, an initial recommendation can be provided for new users considering individual differences. Furthermore, this initial recommendation improves by incorporating low-rank matrix R as more data from the same user are collected.

2.3 Estimator for PRIME

When considering an estimator for PRIME, the PRIME model can estimate two parameters, R and $\beta$, which are assumed to be low-rank and sparse to quantify implicit and explicit similarities, respectively. Equation (2) is proposed to solve for unknown parameters. To satisfy the low-rank property of R and sparsity of coefficient vector $\beta$, the loss function of the estimator includes a nuclear norm and a L-1 norm as constraints to penalize the low-rank matrix R and coefficients $\beta$. For example, decreasing implicit similarities, which are negatively correlated with $\|R\|_*$, leads to larger value of recommendation loss function $$\frac{1}{2}\|Y - R - {}_c\mathcal{A}(X\beta)\|_F^2$$

and thus lower recommendation accuracy. In other words, when individual differences becomes the dominant factor in recommendation scores and overrides influence of the implicit similarities, the recommendation accuracy may not be satisfactory. Similarly, decreasing of explicit similarities, which are negatively correlated with $\|\beta\|_1$, also leads to larger values of the loss function. Decreasing explicit similarities corresponds to the scenarios where covariates 133 provide limited information to identify individual differences. Therefore, enforcing the low-rank structure of R and the sparsity of $\beta$ according to the recommendation accuracy as presented in Equation (2) can improve the quantification of implicit and explicit similarities, respectively $$R, \beta := \underset{R,\beta}{\operatorname{argmin}} \frac{1}{2}\|Y - R - {}_c\mathcal{A}(X\beta)\|_F^2, \quad (2)$$
$$\text{s.t. } \|R\|_* \leq s,$$
$$\|\beta\|_1 \leq t,$$

where $\|\cdot\|_F$ denotes the Frobenius norm, which minimizes the sum of square errors (i.e., difference between the predicted ratings and the true ratings) thus maximizing the recommendation accuracy; $\|\cdot\|_*$ is the nuclear norm to enforce low-rank structure; $\|\cdot\|_1$ is the L-1 norm to select significant covariates 133 for interpreting the recommendation; s$\geq$0 and t$\geq$0 are tuning parameters to control the amount of shrinkages in rank of R and non-zero elements of $\beta$. Specifically, if s becomes larger, similarity among ratings decreases; if t becomes larger, more covariates 133 are significant. Every feasible solution to Equation (2) would yield a recommendation. Equation (2) can be solved by the alternating direction method of multiplier (ADMM).

2.4 ADMM Solver for PRIME

Next, an ADMM Solver for PRIME is discussed. Since the recommendations should be made in a timely manner to avoid usability issues, a fast and efficient solver for Equation (2) is necessary to estimate the model parameters R and $\beta$. Motivated by Split Bregman method, the augmented Lagrangian function $\mathcal{L}$ (R, $\beta$, C, d, U, v) of Equation (2) can be derived as:

$$\mathcal{L}(R, \beta, C, d, U, v) = \frac{1}{2}\|\mathcal{P}_\Omega(Y) - \mathcal{P}_\Omega(R) - \mathcal{P}_\Omega({}_c\mathcal{A}(X\beta))\|_F^2 + \lambda_1\|C\|_* + \quad (3)$$
$$\lambda_2\|d\|_1 + \langle U, R - C\rangle + \langle v, \beta - d\rangle + \frac{\mu_1}{2}\|R - C\|_F^2 + \frac{\mu_2}{2}\|\beta - d\|_2^2,$$

where $\lambda_1 \geq 0$ and $\lambda_2 \geq 0$ denote the tuning parameters for $\|C\|_*$ and $\|d\|_1$, respectively; $\mathcal{P}_\Omega(\cdot)$ is the selector which selects only non-empty elements; $U \in \mathbb{R}^{m \times n}$ and $v \in \mathbb{R}^{p \times 1}$ are dual variables corresponding to the linear constraints C=R and d=$\beta$, respectively; $\langle \cdot, \cdot \rangle$ is an operation of standard inner product in Euclidian space; and $\mu_1 > 0$ and $\mu_2 > 0$ are two tuning parameters to control the amount of penalization for the violation of linear constraints C=R, and d=$\beta$, respectively.

Since all of the terms in Equation (3) are convex, this unconstrained optimization can be easily proven as a convex optimization. However, due to the existences of two non-differentiable terms $\|C\|_*$ and $\|d\|_1$, the theoretical solution cannot be directly obtained by applying KKT conditions, which refers to the first-order necessary condition for a solution to be optimal. According to the convex analysis theory, R* and $\beta$* determine the optimal solution of Equation (2) if the saddle point which satisfied the Inequality (4) holds for all R, $\beta$, C, d, U, and v:

$$\mathcal{L}(R^*, \beta^*, C^*, d^*, U, v) \leq \mathcal{L}(R^*, \beta^*, C^*, d^*, U^*, v^*) \leq$$
$$\mathcal{L}(R, \beta, C, d, U^*, v^*). \quad (4)$$

To efficiently search for the saddle point (i.e., the optimal solution), the embodiments employ an iterative algorithm by alternating between the primal and the dual optimization as follows:

$$\text{Primal:}(R^{k+1}, \beta^{k+1}, C^{k+1}, d^{k+1}) = \underset{R,\beta,C,d}{\operatorname{argmin}} \mathcal{L}(R, \beta, C, d, U^k, v^k), \quad (5)$$
$$\text{Dual:} U^{k+1} = U^k + \mu_1(R^{k+1} - C^{k+1}), v^{k+1} = v^k + \mu_2(\beta^{k+1} - d^{k+1}).$$

Equation (5) presents two steps to iteratively update the feasible solution. The first step minimizes the augmented Lagrangian function with respect to R, $\beta$, C, and d on the basis of the last estimation of dual variables U and v. The second step updates the dual variables by using the estimation of R, $\beta$, C, and d obtained in the first step. Furthermore, an ADMM approach, which is a practical variant of the augmented Lagrangian method (ALM), is implemented to decouple the non-differentiable terms of $\mathcal{L}$ (R, $\beta$, C, d, U, v) and solve the primal problem by alternating the minimization of R, $\beta$, C, and d as follows:

$$R^{k+1} := \underset{R}{\operatorname{argmin}} \frac{1}{2}\|\mathcal{P}_\Omega(Y) - \mathcal{P}_\Omega(R) - \mathcal{P}_\Omega({}_c\mathcal{A}(X\beta^k))\|_F^2 + \quad (6)$$
$$\langle U^k, R - C^k\rangle + \frac{\mu_1}{2}\|R - C^k\|_F^2,$$
$$\beta^{k+1} := \underset{\beta}{\operatorname{argmin}} \frac{1}{2}\|\mathcal{P}_\Omega(Y) - \mathcal{P}_\Omega(R^{k+1}) - \mathcal{P}_\Omega({}_c\mathcal{A}(X\beta))\|_F^2 +$$
$$\langle v^k, \beta - d^k\rangle + \frac{\mu_2}{2}\|\beta - d^k\|_2^2,$$

-continued $$C^{k+1} := \underset{C}{\operatorname{argmin}} \lambda_1 \|C\|_* + \langle U^k, R^{k+1} - C \rangle + \frac{\mu_1}{2} \|R^{k+1} - C\|_F^2,$$

$$d^{k+1} := \underset{C}{\operatorname{argmin}} \lambda_2 \|d\|_1 + \langle v^k, \beta^{k+1} - d \rangle + \frac{\mu_2}{2} \|\beta^{k+1} - d\|_2^2.$$

In Equation (6), the optimal solutions for the minimization of R and β can be theoretically derived since the corresponding objective functions are quadratic. Though the minimization of C and d cannot be solved in the same way, they can be optimized efficiently by applying soft-thresholding approach in Equation (7) and Equation (8).

Considering the singular value decomposition (SVD) of $C \in \mathbb{R}^{m \times n}$ of rank r, $C = A\Sigma \beta^*$, where $A \in \mathbb{R}^{m \times r}$ $\beta \in \mathbb{R}^{r \times n}$ are orthonormal matrices, β* is the conjugated transpose of β, $\Sigma = \operatorname{diag}(\{\sigma_i\}_{1 \leq i \leq r})$ is the singular value matrix in which $\sigma_i > 0$ for all $1 \leq i \leq r$. Previous studies have introduced the singular value soft-thresholding operator $\mathcal{D}_\tau(\bullet)$:

$$\mathcal{D}_\tau(C) := A \mathcal{D}_\tau(\Sigma) \beta^*, \mathcal{D}_\tau(\Sigma) = \operatorname{diag}(\{(\sigma_i - \tau)_+\}_{1 \leq i \leq r}), \quad (7)$$

where $(\sigma_i - \tau)_+ = \max(0, \sigma_i - \tau)$. Previous studies have proved the singular value soft-thresholding operator to be the solution of nuclear norm minimization problem.

To solve the minimization of d, some researchers have proposed a soft shrinkage operator $\mathcal{T}_{\lambda, \lambda}(\bullet)$:

$$\mathcal{T}_{\lambda, \lambda}(w) = [t_\lambda(w_1), t_\lambda(w_2), \ldots]^T, t_\lambda(w_i) = \operatorname{sgn}(w_i) \cdot \{(w_i - \lambda)_+\}, \quad (8)$$

where $(w_i - \lambda)_+ = \max(0, w_i - \lambda)$. Thus, Algorithm 1, shown below, is proposed to estimate the parameters of Equation (1).

---

ALGORITHM 1: ADMM Solver for PRIME

Input: Sparse response matrix Y, feature matrix X, tuning parameters $\lambda_1, \lambda_2, \mu_1$, and $\mu_2$.
Output: Learned coefficients β, low-rank matrix $\overline{R}$, completed matrix $\hat{Y}$.
Initialize $R^0, \beta^0, C^0, d^0, U^0$, and $v^0$.
repeat $$R^{k+1} = \frac{1}{1+\mu_1}\left(Y - {_c}\mathcal{A}(X\beta^k) - U^k + \mu_1 C^k\right),$$

$$\beta^{k+1} = \left(X_\Omega^T X_\Omega + \mu_2 I\right)^{-1}\left[X_\Omega^T(y_\Omega - r_\Omega^{k+1}) - v^k + \mu_2 d^k\right],$$

$$C^{k+1} := \mathcal{D}_{\frac{\lambda_1}{\mu_1}}\left(R^{k+1} + \frac{U^k}{\mu_1}\right),$$

$$d^{k+1} := \mathcal{T}_{\frac{\lambda_2}{\mu_2}}\left(\beta^{k+1} + \frac{v^k}{\mu_2}\right),$$

$$U^{k+1} = U^k + \mu_1(R^{k+1} - C^{k+1}),$$

---

ALGORITHM 1: ADMM Solver for PRIME $$v^{k+1} = v^k + \mu_2(\beta^{k+1} - d^{k+1}),$$

until
Convergence: $\|y_\Omega - X_\Omega \beta^{k+1} - r_\Omega^{k+1}\|_2 - \|y_\Omega - X_\Omega \beta^k - r_\Omega^k\|_2 / \|y_\Omega - X_\Omega \beta^k - r_\Omega^k\|_2 \leq \text{tol}$.

---

In Algorithm 1, $X_\Omega$ denotes the feature matrix 124 which only includes the corresponding observations for the non-sparse entries in the sparse response matrix Y; $I \in \mathbb{R}^{p \times p}$ is the identity matrix; $u^\Omega$ denotes a column vector which contains only the non-sparse entries of Y; and $r_\Omega^{k+1}$ is a column vector which includes the corresponding entries of $R^{k+1}$ for the non-zero entries Y. In the embodiments, to balance the speed and the accuracy, tolerance tol of convergence was set to be $10^{-6}$. Note that the tolerance can be adjusted according to the needs of different applications. In practice, the algorithm takes around 40 to 60 iterations to converge, sufficiently fast to support online recommendation. When the number of predictors p is large (e.g. >1000), high computational cost will occur at the matrix inverse term $(X_\Omega^T X_\Omega + \mu_2 t)^{-1}$. Fortunately, Algorithm 1 does not update the inverse during the iterations, so the inverse can be calculated at the initialization step before the iterations, significantly reducing the computational costs. Extended from matrix completion, the model estimation and recommendation are completed by executing Algorithm 1.

2.5 Recommendation Procedures for PRIME

Next, the embodiments include various recommendation procedures for PRIME. In some examples, the embodiments organize the sparse response matrix Y for PRIME as presented in Table 1, in which each row represents one user, columns are generated from enumerating visualization designs 128 and tasks, and the entries labeled with "*" represents example historical users' ratings for contexts (i.e., a combination of a task and a visualization design). For example, in this research, the (i, j)$^{-th}$ entry of Y can be defined as the perceived task complexity score rated by the i-th participant on the j-th context. By feeding covariates X and sparse response matrix Y into PRIME, PRIME will complete Y as $\hat{Y}$ by providing predictions for missing entries in Y. Hence, for user i given task t, the visualization design d* can be suggested by selecting the visualization design associated with lowest predicted ratings (i.e., the lowest complexity scores). Mathematically, $$d^* = \underset{d}{\operatorname{argmin}} \hat{Y}[i, (t, d)].$$

TABLE 1

Organization of sparse response matrix for PRIME.

| | Visualization Design 1 | | | Visualization Design 2 | | | Visualization Design 3 | | |
|---|---|---|---|---|---|---|---|---|---|
| | Task 1 | Task 2 | ... | Task 1 | Task 2 | ... | Task 1 | Task 2 | ... |
| User 1 | * | | | | | | | * | |
| User 2 | | * | | * | | | | | |
| User 3 | | | | * | | | * | | * |
| ... | * | | | | | | | * | |

* Example historical users' ratings for contexts (i.e., a combination of a task and a visualization design)

3. Simulation Study

Next, a discussion of the simulation study to evaluate the various embodiments of the PRIME framework that quantifies the implicit and explicit similarity for recommendation given relatively small sample size. The core idea for this simulation study is to generate covariates X and subjective ratings Y with missing entries as inputs for PRIME modeling framework with different sample sizes and relative importance between implicit and explicit similarities. Based on the outputs (i.e., predicted ratings $\hat{Y}$, estimated low-rank matrix $\hat{R}$, and model coefficients $\hat{\beta}$), this simulation study evaluates the recommendation accuracy and the parameter estimation accuracy of PRIME. Specifically, high recommendation accuracy validates the capability for accurate recommendation, whereas, high parameter estimation accuracy validate the capability for the quantification of implicit and explicit similarities. Since no ground truth for implicit and explicit similarities can be provided in a user study, a simulation with controllable similarities is necessary to stress the boundary of the PRIME modeling framework.

3.1 Simulation Setup

The simulation study is conducted to stress the PRIME recommender system to understand its statistical properties. For example, how do different sample sizes affect the prediction accuracy and how accurate is PRIME in quantifying implicit and explicit similarities? First, the present disclosure considers the generation of ground truth for low-rank matrix R to represent implicit similarity and model coefficient $\beta$ for explicit similarity. To mimic the low-rank structure in R introduced by implicit similarity in recommendation scores, low-rank matrix R can be adopted from three icons, namely, block, cross, and star as presented in the top row in FIG. 2. For the explicit similarity contained in covariates 133, the embodiments control the sparsity as sparsity $\in \{0.3, 0.7\}$, i.e., the percentage of non-zero elements in $\beta$. The non-zero elements of $\beta$ are randomly generated from a normal distribution $N(0, 1)$. The sparsity in $\beta$ can be interpreted as the information contained in covariates 133. Namely, sparser $\beta$ identifies less informative covariates 133, and vice versa. These Rs and $\beta$s will serve as the ground truth for the generation of model input covariates X and subjective ratings Y, and will be compared with the corresponding parameter estimations of $\hat{R}$ and $\hat{\beta}$.

Suppose that the underlying subjective rating process for the i-th user in the j-th context is represented by $y_{ij}=r_{ij}+x_{i,j}\beta+e_{ij}$, where $y_{ij}$ and $r_{ij}$ are the (i, j)-th elements of Y and R, respectively; $x_{ij} \in \mathbb{R}^{1\times p}$, $\beta \in \mathbb{R}^{p\times 1}$, and p is the number of features; $e_{ij}$ is (i, j)-th elements of E which follows normal distribution $N(0,0.1)$. This simulation study sets p=50 to generate high dimensional feature vectors. Further, this simulation study controls the relative significance of implicit and explicit similarities by varying the magnitude ratio $mr=max|R|/max|X\beta|$ within two levels: $mr \in \{0.1, 0.5\}$. For example, mr=0.1 represents the scenario when explicit similarity is about ten times larger than the implicit similarity. Moreover, since PRIME is proposed for the recommender system with limited historical data set, three levels of sample sizes are used to stress PRIME, namely, $m=n \in \{10,20,40\}$, so that the dimension of Y is significantly lower than traditional recommender systems, which typically rely on millions of records.

Figure 2:
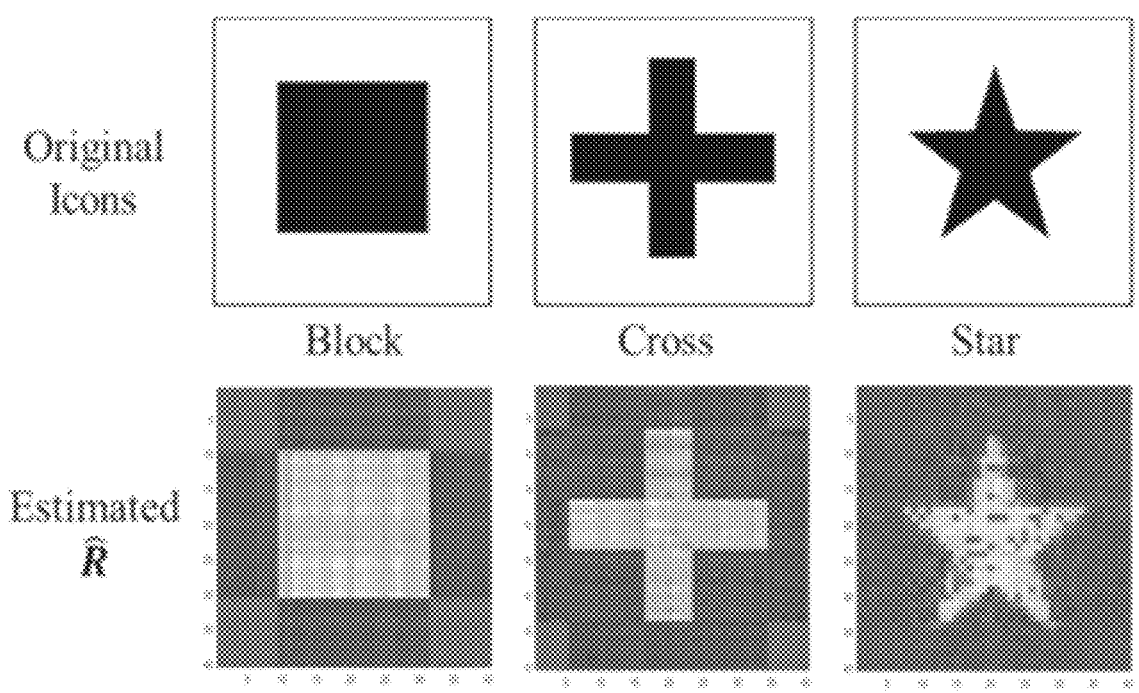
FIG. 2 is a graphical representation of simulated three low-rank matrices and estimated low-rank matrices, according to one embodiment described herein.

FIG. 2 illustrates simulated three low-rank matrices R and estimated low-rank matrices $\hat{R}$ by using PRIME. Here black and white colors in original icons represent 1 and 0 values in the simulated R, respectively. Colors from blue to yellow in the estimated $\hat{R}$ represent the absolute values of $\hat{R}$ where blue for values close to 0, and yellow for those close to 1.

PRIME is compared against three benchmark models, i.e., (i) the Lasso regression, which only quantifies explicit similarities contained in covariates 133 but ignores the similarities in historical recommendation scores; (ii) data shared Lasso (DSL), which quantifies implicit similarities among users' mental status as well as a limited proportion of explicit similarities; and (iii) proximal nuclear norm minimization-based matrix completion, which predicts merely based on historical recommendation scores. From a modeling perspective, these benchmark models are selected to demonstrate the contribution for PRIME to integrate low-rank estimation of R and traditional regularized linear regression term $X\beta$. Specifically, the Lasso and DSL only consider $X\beta$, while matrix completion only consider R. The four recommendation models providing different capabilities in accounting for individual difference and sample size/outlier limitations were evaluated. All the models were trained and tested by using 10-fold cross-validation (CV) with the same partition of folds, and tuning parameters are selected by using 10-fold cross-validation for the Lasso, DSL, and PRIME. Within each CV fold, 10% arbitrarily selected entries in Y are missed (i.e., are set to be zeros).

TABLE 2

Averages of normalized root mean squared error in percentage from 10 fold cross-validations (lowest average values are highlighted in bold).

| | | | Sparsity = 0.3 | | | Sparsity = 0.7 | | |
|---|---|---|---|---|---|---|---|---|
| | | | Block | Cross | Star | Block | Cross | Star |
| m, n = 10 | mr = 0.1 | MC | 18.16 | 20.56 | 17.33 | 20.49 | 21.18 | 21.05 |
| | | Lasso | 5.06 | 5.46 | 3.02 | 5.78 | 6.93 | 4.85 |
| | | DSL | 19.48 | 21.53 | 17.26 | 20.93 | 20.85 | 21.09 |
| | | PRIME | 4.87 | 5.24 | 2.72 | 6.48 | 7.00 | 5.61 |
| | mr = 0.5 | MC | 18.09 | 23.10 | 20.92 | 20.31 | 24.03 | 20.19 |
| | | Lasso | 15.56 | 20.39 | 15.03 | 19.25 | 22.02 | 16.54 |
| | | DSL | 18.31 | 23.92 | 21.59 | 22.04 | 23.07 | 19.78 |
| | | PRIME | 12.11 | 17.48 | 13.22 | 15.18 | 18.26 | 14.80 |
| m, n = 20 | mr = 0.1 | MC | 17.42 | 19.50 | 16.58 | 17.01 | 17.32 | 15.62 |
| | | Lasso | 5.14 | 4.08 | 3.47 | 4.52 | 4.11 | 3.51 |
| | | DSL | 16.86 | 18.73 | 15.92 | 16.83 | 17.25 | 15.98 |
| | | PRIME | 3.39 | 4.02 | 3.11 | 2.69 | 2.94 | 2.89 |
| | mr = 0.5 | MC | 17.68 | 18.05 | 15.07 | 17.83 | 20.35 | 17.20 |
| | | Lasso | 15.50 | 14.62 | 12.05 | 16.25 | 16.70 | 12.68 |
| | | DSL | 18.40 | 19.25 | 16.05 | 18.34 | 20.21 | 17.47 |
| | | PRIME | 12.83 | 11.76 | 10.23 | 14.07 | 13.95 | 11.05 |

TABLE 2-continued

Averages of normalized root mean squared error in percentage from 10 fold cross-validations (lowest average values are highlighted in bold).

|  |  |  | Sparsity = 0.3 | | | Sparsity = 0.7 | | |
|---|---|---|---|---|---|---|---|---|
|  |  |  | Block | Cross | Star | Block | Cross | Star |
| m, n = 40 | mr = 0.1 | MC | 15.04 | 14.35 | 15.48 | 14.16 | 14.89 | 14.32 |
|  |  | Lasso | 4.63 | 3.97 | 3.11 | 4.19 | 3.93 | 3.33 |
|  |  | DSL | 13.78 | 13.06 | 13.94 | 13.25 | 13.95 | 13.67 |
|  |  | PRIME | 2.19 | 2.18 | 2.30 | 2.29 | 2.24 | 2.62 |
|  | mr = 0.5 | MC | 16.27 | 16.27 | 14.67 | 19.78 | 17.52 | 15.70 |
|  |  | Lasso | 16.32 | 13.64 | 11.63 | 16.00 | 14.40 | 12.37 |
|  |  | DSL | 19.64 | 17.31 | 14.71 | 19.46 | 17.41 | 15.74 |
|  |  | PRIME | 12.73 | 11.10 | 10.97 | 14.42 | 13.26 | 11.55 |

3.2 Simulation Results

As for the simulation results, the estimated low-rank matrices $\hat{R}$ by using PRIME is presented in FIG. 2. Comparisons between the estimated $\hat{R}$ with original icons showed that PRIME is able to reconstruct the low-rank structure of sparse response matrix Y. Hence, PRIME can be used for quantifying the implicit similarity.

The normalized root mean squared error (NRMSE) and parameter estimation error (PE) in Equation (9) and (10), respectively, are used to evaluate the recommendation performance of all four models, where lower NRMSE represents more accurate recommendation results, and lower PE represents more accurate selection of significant features. Note that PE is only applicable to the Lasso and PRIME since matrix completion model is nonparametric, whereas, DSL yields different parameters for different users.

$$NRMSE = \frac{\sqrt{\|Y - \hat{Y}\|_F^2/mn}}{\max Y - \min Y} \times 100\%, \quad (9)$$

$$PE = \frac{\sum_{i=1}^{p} |\hat{\beta}_i - \beta_i|}{\sum_{i=1}^{p} |\beta_i|} \times 100\%. \quad (10)$$

Table 2 summarizes the average NRMSEs over 10 CV folds for PRIME and three benchmark models. The PRIME model yields the smallest NRMSEs in most scenarios. The reason is that PRIME quantifies both implicit and explicit similarities, explaining more statistical variance of Y than benchmark models. On hand, when the sample size is relatively small with m, n=10, PRIME has comparable NRMSEs to Lasso. On the other hand, as sample size increases, i.e., m, n=20 and m, n=40, PRIME provides much lower NRMSEs than the other three benchmark models. In addition, when the magnitude ratio mr increases from 0.1 to 0.5 with sample size m, n=10, PRIME performs much better than the Lasso. The reason is that a linear regression model (e.g., the Lasso) is not able to model the variation which cannot be explained by covariates 133. PRIME provides a way to effectively extract more information from the residuals of a linear model.

TABLE 3

Averages of parameter estimation error in percentage from 10 fold cross-validations (lowest average values are highlighted in bold)*.

|  |  |  | Sparsity = 0.3 | | | Sparsity = 0.7 | | |
|---|---|---|---|---|---|---|---|---|
|  |  |  | Block | Cross | Star | Block | Cross | Star |
| m, n = 10 | r = 0.1 | Lasso | 0.248 | 0.305 | 0.237 | 0.267 | 0.246 | 0.197 |
|  |  | PRIME | 0.211 | 0.207 | 0.191 | 0.332 | 0.260 | 0.211 |
|  | r = 0.5 | Lasso | 0.711 | 0.683 | 0.712 | 0.831 | 0.811 | 0.814 |
|  |  | PRIME | 0.566 | 0.716 | 0.633 | 0.634 | 0.556 | 0.674 |
| m, n = 20 | r = 0.1 | Lasso | 0.144 | 0.074 | 0.117 | 0.132 | 0.122 | 0.092 |
|  |  | PRIME | 0.086 | 0.072 | 0.098 | 0.067 | 0.079 | 0.073 |
|  | r = 0.5 | Lasso | 0.578 | 0.556 | 0.361 | 0.573 | 0.511 | 0.385 |
|  |  | PRIME | 0.252 | 0.266 | 0.263 | 0.173 | 0.183 | 0.153 |
| m, n = 40 | r = 0.1 | Lasso | 0.081 | 0.061 | 0.039 | 0.083 | 0.052 | 0.053 |
|  |  | PRIME | 0.045 | 0.033 | 0.033 | 0.031 | 0.026 | 0.028 |
|  | r = 0.5 | Lasso | 0.243 | 0.235 | 0.274 | 0.355 | 0.302 | 0.238 |
|  |  | PRIME | 0.110 | 0.090 | 0.097 | 0.099 | 0.056 | 0.067 |

*PE is only applicable to the Lasso and PRIME

Table 3 summarizes the average PEs over 10 CV folds. The embodiments of the PRIME model provides the best parameter estimation accuracy in most scenarios, especially when sample size increases from 10 to 40. An interesting finding is that for higher sparsity (i.e., less zeros in β) with relatively larger sample sizes, PRIME presents more accurate PEs with smaller sparsity, while the Lasso shows the reverse or comparable pattern. One possible explanation can be that PRIME can better satisfy the i.i.d. assumption for linear model by separating the low-rank matrix R from the residuals of linear model Xβ, demonstrating the merits of PRIME in integrating both low-rank matrix R and linear regression term Xβ to quantify and separate explicit and implicit similarities. Intuitively, quantifying larger proportion of similarities by including more information from the hidden correlations among subjective ratings improves the explained variance of the ratings and thus recommendation accuracy. Low PEs also indicate the capability to accurately quantify the explicit similarity contained in covariates 133. In summary, the results from the simulation study indicates that PRIME can accurately quantify both implicit and explicit similarities, thereby providing more accurate recommendations.

4. PRIME Evaluation in a User Study

Next, the PRIME framework was evaluated in user study. Based on the statistical evaluation in the simulation study, it is further demonstrated how to apply the proposed PRIME framework in a user study to support fast recommendation for visualization designs given a pre-defined task for a user. In this section, PRIME was evaluated with data collected from an earlier visualization evaluation study summarized below. In general, the procedures to apply PRIME modeling framework to the user study can be summarized into four steps:

1. Define covariates and corresponding feature extraction methods to organize covariates matrix X; Define a measure to organize the sparse response matrix Y by following the format described in Table 1.
2. Feed input X and Y into PRIME modeling framework and execute Algorithm 1 to obtain the completed response matrix $\hat{Y}$, estimated low-rank matrix $\hat{R}$ and model coefficient vector $\hat{\beta}$.
3. Follow the optimization described in Section 2.5 to recommend the visualization design associated with the lowest perceived task complexity score given the user and task.
4. [Optional] Investigate the explicit similarity quantified $\hat{\beta}$, and implicit similarity quantified by $\hat{\beta}$.

In this user study, covariates X is defined as features extracted from physiological signals (see Section 4.2 for details) and define perceived task complexity score as the measure to organize the sparse response matrix 127.

4.1 Visualizations and Apparatus

Next, the three interactive visualization designs were tested: (i) static node-link tree, (ii) collapsible node-link tree, and (iii) zoomable pack layout (FIG. 3), which were provided by an open source visualization library D3. Three randomly generated arrays of 252 English names were visualized by these designs.

This user study employed a computer workstation connected to two 24" (1920*1200 resolution) monitors. One monitor presented the visualization to the participant, whereas the other presented the real-time EEG signals and eye movements to the experimenter. The input tools were a mouse and a keyboard. The computer workstation was installed with a data logging program and a SMI® REDn remote eye tracker (20 Hz). Participants were instrumented with a 10-channel ABM® B-Alert X10 wireless EEG headset (256 Hz, Electrocardiography (ECG), Fz, F3, F4, Cz, C3, C4, POz, P3, P4). An ABM® external synchronize unit (ESU) time-synchronized the EEG and eye movement data prior to transmission to the computerworkstation.

A within-subject design included 12 predefined tasks for three different visualizations. The experiment began with instrumenting the participants with the EEG headset, eye tracking device, and setting up the user input logging system. Then, each participant performed 12 tasks (i.e., 1 free exploration and 11 sustained visual search tasks with different levels of task difficulties) for each visualization in random orders. Only the 11 sustained visual search tasks are included in the evaluation of PRIME since the free exploration tasks was used to standardize participants' physiological signals. Tasks could be classified into three levels of difficulties according to the levels of the given nodes. Level is defined by the distance between the node and the root in a hierarchical data set. The participants used the mouse at all times. At the end of each task, the participants used the keyboard to enter the perceived task complexity ratings between 1 and 10 and then answer the predefined questions for Task 9-11.

Figure 3:
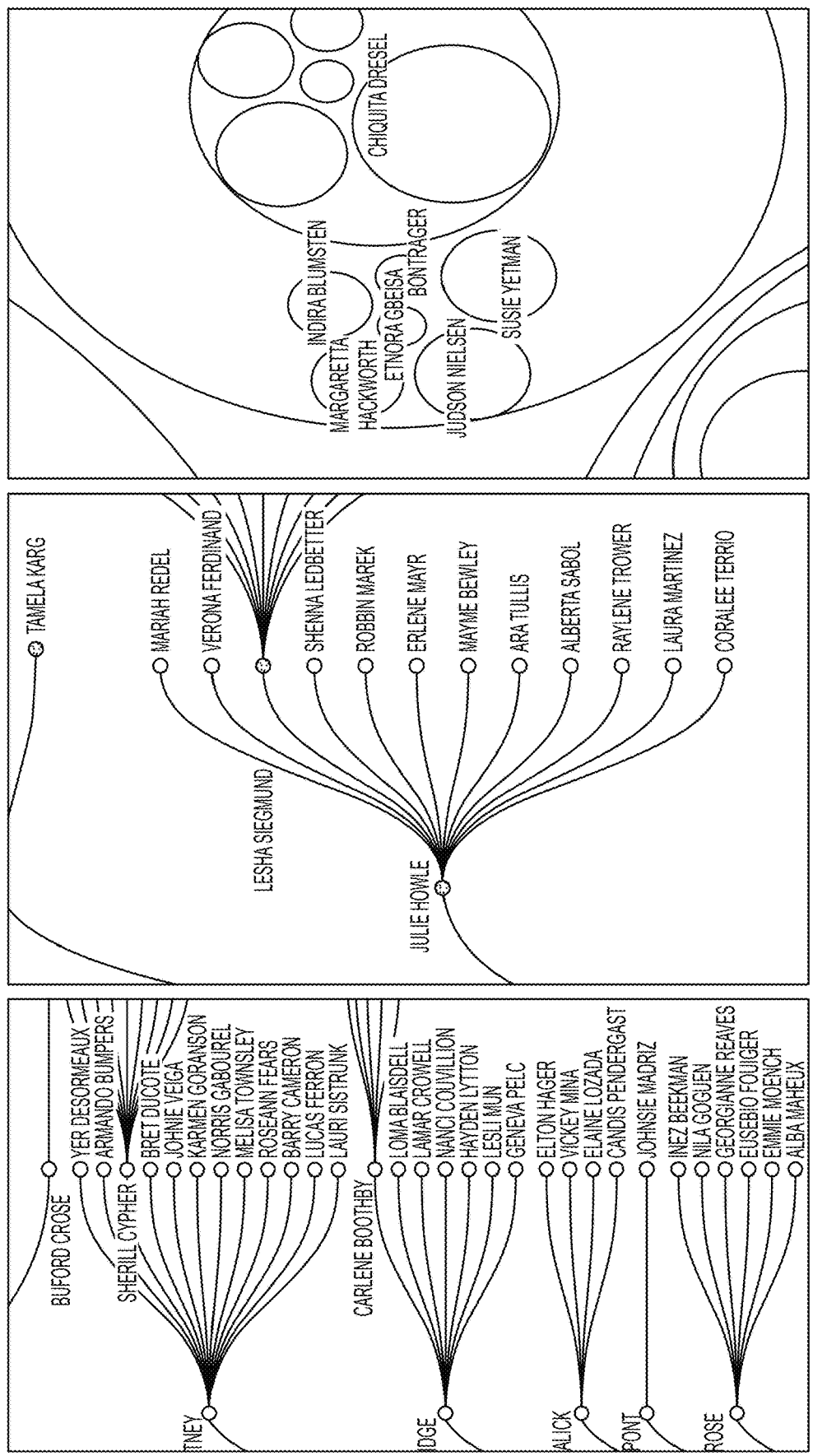
FIG. 3 illustrates example visualization designs, according to one embodiment described herein.

FIG. 3 illustrates three visualization designs. (a) Static node-link tree, in which names and hierarchical relationships were mapped to the circles, texts and edges, respectively. (b) Collapsible node-link tree with same primitives as (a), but each circle can be expanded/collapsed to show/hide the corresponding branches. And (c) zoomable pack layout, which map the hierarchical name data set to nested and zoomable circles.

Fifteen participants were recruited from population of undergraduates, graduates, and faculty members. Participant #4 was removed from the data set due to missing records. The final dataset included nine male and five female participants with an age range of 24-35 (M=29.11, SD=3.60), and 24-32 (M=27.40, SD=2.58), respectively. An estimation of the sample size was based on the consideration of adequate degree of freedoms in a linear regression model. Participants were deliberately recruited from 13 departments with different backgrounds and experiences to amplify individual differences for testing PRIME.

4.2 Feature Extraction

As for feature extraction, the raw data included EEG signals, eye movements, and user input logs (e.g., computer keyboard, computer mouse) and corresponding time stamps. For this example study, 15 new features were extracted from eye gaze patterns using the frequent subgraph mining (FSM) technique, and four new features from the eye gaze transitions among predefined areas of interest (AOIs). Table 4 presents all extracted features for the modeling in this study.

4.2.1. Eye Moving Patterns Extraction Via Frequent Subgraph Analysis

The various embodiments can include eye moving patterns extractions via frequent subgraph analysis. Traditional eye gaze analysis aggregated spatio-temporal eye movements to generate summary statistics as features. However, individual differences in eye movement patterns are neglected by these aggregation methods. Frequent subgraph mining (FSM) has been found effective in extracting the substructure of graphs or sequences for many scientific and commercial applications, such as molecule substructures and patterns of personal transactions. In the context of the present disclosure eye movements were modeled between AOIs as graphs of events, such that the FSM technique can extract scanning patterns (i.e., frequent subgraphs) when exploring different visualizations. The FSM-extracted features can capture individual search patterns and characteristics of different visualizations. Specifically, different search patterns (e.g., depth-first or breadth-first searching) and visualization layouts (e.g., static or interactive, in tree or pack of circles) affect the counts, lengths and structures of frequent subgraphs to provide different statistical features. In this study, Moss subgraph mining package proposed by were used to mine the frequent subgraphs and yielded 15 statistical features (see Table 4).

TABLE 4

Summary of features extracted from the EEG signals, eye movements and user input behaviors (new features extracted for this study are highlighted in bold).

| Data | Feature Types | Features | Accumulated Number of Features |
|---|---|---|---|
| EEG signals (10 channels, 5 bands per channel) | Statistical features | Mean | 50 |
| | | Standard deviation (SD) | 100 |
| | | Energy | 160 |
| | | Entropy | 200 |
| | | Kurtosis | 250 |
| | | Skewness | 300 |
| | Morphological features | Curve length | 360 |
| | | Mean of nonlinear energy operator | 400 |
| | Time-frequency feature | Wavelet entropy | 450 |
| Eye movements | Eye hits in AOIs | Mean and SD | 452 |
| | Eye gaze transitions | Mean and SD | 454 |
| | Frequent subgraph mining-related features | Counts of frequent subgraphs | 455 |
| | | Mean and SD of length of frequent subgraphs | 457 |
| | | Mean and SD of mean(Code 1) | 459 |
| | | Mean and SD of SD(Code 1) | 461 |
| | | Mean and SD of mean(Code 2) | 463 |
| | | Mean and SD of SD(Code 2) | 465 |
| | | Mean and SD of mean(Code1^Code2) | 467 |
| | | Mean and SD of SD(Code1^Code2) | 469 |
| | Time-related features | Mean and SD of eye gaze time | 471 |
| | | Mean and SD of eye transition time | 473 |
| User input behaviors | Mouse hits in AOIs | Mean and SD | 425 |
| | Mouse events | Count of events | 476 |
| | Mouse transitions | Mean and SD | 478 |
| | Task performance | Completion time | 479 |

Figure 4:
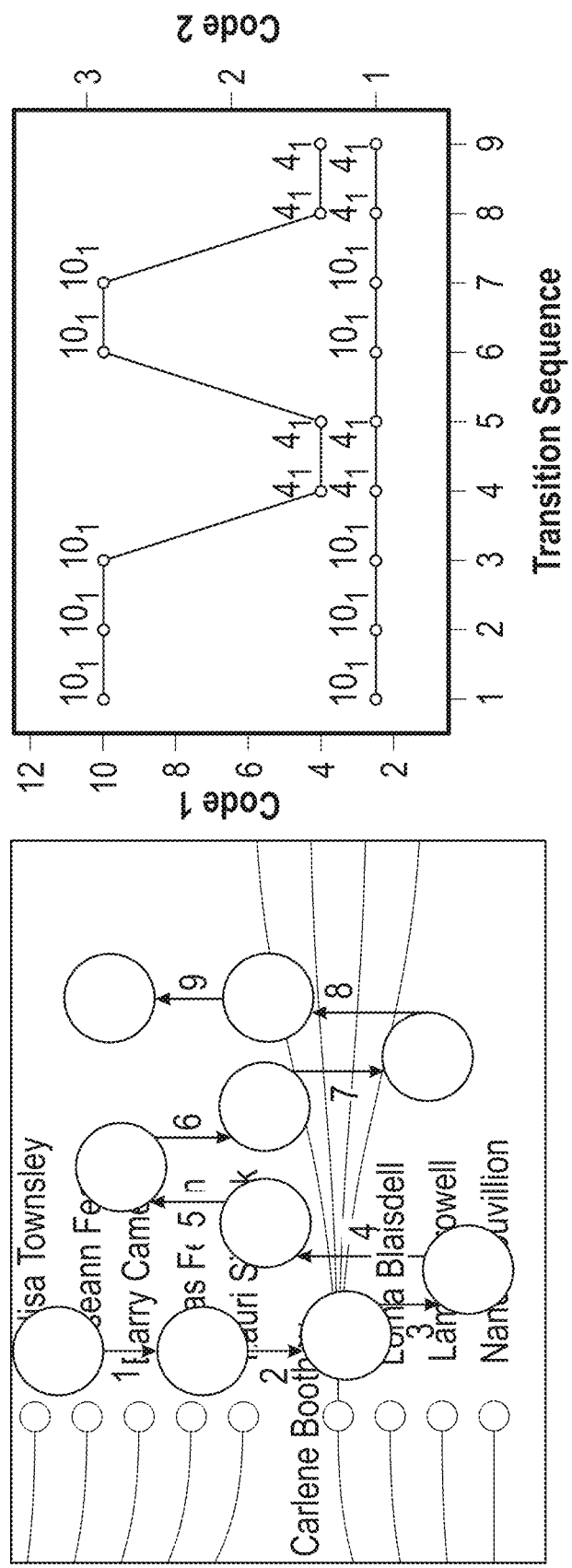
FIG. 4 is a graphical interpretation of a sample frequent subgraph according to one embodiment described herein.

FIG. 4 presents an example of an extracted frequent subgraph and the corresponding real eye fixation transitions. The diagram on right of FIG. 4 shows circles defining the fixation at AOIs, arrows representing the encoded transitions, and numbers reflecting the orders in the frequent subgraphs. The diagram on left of FIG. 4 shows a frequent subgraph (i.e., transition 1~9) reflecting the reading path commonly adopted by one participant. The example in FIG. 4 illustrates that, given the static node-link tree diagram, the participant prefers to read downward and upward (i.e., Code1∈{4, 10}) along with successive circles and names (i.e., Code2=1). The advantages of FSM-based eye gaze analysis are that (i) the individual differences explained by personal reading path can be quantified by extracting features from frequent subgraphs, and (ii) visualization can be designed to accommodate user preference depicted by the frequent subgraphs.

FIG. 4 includes a graphical interpretation of a sample frequent subgraph. The transition sequence 1-9 in the left chart are associated with the arrows in the right diagram. 10% and 4% are the encoded transition label corresponding to the downwards transition and upwards transition with short radial distance, respectively.

4.3 PRIME Evaluation Setup

As for the PRIME evaluation setup, each sample is a pre-defined task performed by one participant using one visualization resulting in 462 samples (i.e., 11×14×3). In total, 479 features (Table 4) were extracted from the raw data, and the recommendation scores were the complexity score perceived by the participant for each task. In addition, four statistical cases were extracted from the experimental data set (Table 5) to evaluate PRIME against other state-of-the-art modeling techniques. These four statistical cases represent when (i) level of individual differences are very high among participants, (ii) level of individual differences are moderate or low, (iii) very limited number of participants and number of tasks are recruited for experiment (i.e., four participants and five tasks), and (iv) a few unexpected responses (i.e., extremely high or extremely low) are gathered, respectively.

TABLE 5

Definition of CV folds for four statistical cases in three scenarios.

| Statistical Cases | Scenarios | CV Folds |
|---|---|---|
| Full rank (14 × 33) | Arbitrarily empty entries | 10-fold CV |
| | Missing one type of tasks | 11-fold CV |
| | Missing one participant | 14-fold CV |
| Low rank (8 × 6) | Arbitrarily empty entries | 5-fold CV |
| | Missing one task | 6-fold CV |
| | Missing one participant | 8-fold CV |
| Low sample size (4 × 5) | Arbitrarily empty entries | 5-fold CV |
| | Missing one task | 5-fold CV |
| | Missing one participant | 4-fold CV |
| Outliers (14 × 11) | Arbitrarily empty entries | 5-fold CV |
| | Missing one task | 11-fold CV |
| | Missing one participant | 14-fold CV |

To evaluate the model via leave-one-fold/task/participant-out cross-validation (CV) with different partitions of training and testing datasets, three practical scenarios of different sparsity characteristics were used: (i) arbitrarily empty entries, (ii) missing one (type of) task(s) (i.e., entire column), and (iii) missing one participant (i.e., entire row). Folds are obtained by evenly partitioning a data set to contain approximately the same number of samples. The three scenarios corresponded to incomplete experiment runs, new tasks, and new participants, respectively. The partition of each fold was determined by the sample size and the type of scenarios (see Table 5). For example, a ten-fold leave-one-fold-out CV was applied to the full rank case under the scenario of arbitrarily empty entries, while an 11-fold leave-one-task-out CV was applied to the full rank case with one (type of) missing task(s).

Based on the completed sparse response matrix V, the embodiments can follow the optimization procedure in Section 2.5 to recommend the visualization design associated with the lowest perceived task complexity score given the user and task. The recommendations were made when the participants were not exploring the visualization designs by directly changing the designs, thus PRIME did not intervene participants' exploration. In this user study, the participants were required to explore all candidate visualization designs, hence they did not need to reject or accept a recommendation from PRIME. To evaluate the alignments between our recommendation and the true preference, a series of pairwise t-tests with Bonferroni correction were conducted to test the null hypothesis "no significant difference exists between the recommended visualization designs and truly preferred visualization designs" per task and per user.

FIG. 4 includes results of PRIME for four extreme statistical cases in three practical scenarios, where the testing errors (RMSEs and standard errors) of PRIME are compared with three benchmark models, i.e., the Lasso, DSL, and MC.

for simultaneous comparisons, the significance level was adjusted to $$\alpha_P = \frac{0.05}{14} = 0.0036$$

for the tests per task, and for the tests per participant. According to Table 6 and 7, the embodiments of the present disclosure does not reject the null-hypothesis that "no significant difference exists between the recommended visualization designs and truly preferred visualization designs" per task and per user. In other words, the recommended visualization designs for different participants and different tasks are well aligned with the true preferences of visualization designs. By comparing the p-values of PRIME with benchmark methods, it can be easily concluded that PRIME significantly outperform Lasso, DSL, and MC. The poor performance of MC is caused by the violation of arbitrarily empty entry assumption in such a cold-start problem (i.e., new tasks or new participants).

TABLE 6

Hypothesis testing results (p-values*) per task.

| Tasks | 1 | 2 | 3 | 4 | 5 | 6 | 7 | 8 | 9 | 10 | 11 |
|---|---|---|---|---|---|---|---|---|---|---|---|
| Lasso | $<\alpha_T$ | 0.02 | 0.17 | 0.20 | 0.49 | $<\alpha_T$ | 0.97 | 0.19 | 0.02 | $<\alpha_T$ | 0.44 |
| DSL | $<\alpha_T$ | 0.05 | 0.13 | 0.14 | 0.80 | $<\alpha_T$ | 0.98 | 0.17 | 0.02 | 0.06 | 0.74 |
| MC | $<\alpha_T$ | $<\alpha_T$ | $<\alpha_T$ | $<\alpha_T$ | $<\alpha_T$ | $<\alpha_T$ | $<\alpha_T$ | $<\alpha_T$ | $<\alpha_T$ | $<\alpha_T$ | $<\alpha_T$ |
| PRIME | 1 | 0.09 | 0.46 | 0.68 | 0.33 | 0.55 | 0.10 | 0.87 | 0.43 | 0.20 | 0.27 |

*Significant level $\alpha_T = 0.0045$.

TABLE 7

Hypothesis testing results (p-values*) per participant.

| Participants | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Lasso | 0.56 | $<\alpha_P$ | 0.30 | 0.17 | 0.16 | $<\alpha_P$ | 0.81 | 0.20 | 0.15 | $<\alpha_P$ | 0.24 | 0.13 | 0.87 | 0.07 |
| DSL | 0.67 | $<\alpha_P$ | 0.40 | 0.34 | 0.01 | 0.04 | 0.12 | 0.49 | 0.77 | $<\alpha_P$ | 0.17 | 0.17 | 0.88 | 0.06 |
| MC | $<\alpha_P$ | $<\alpha_P$ | $<\alpha_P$ | $<\alpha_P$ | $<\alpha_P$ | $<\alpha_P$ | $<\alpha_P$ | $<\alpha_P$ | $<\alpha_P$ | $<\alpha_P$ | $<\alpha_P$ | $<\alpha_P$ | $<\alpha_P$ | $<\alpha_P$ |
| PRIME | 1 | 0.39 | 0.70 | 0.55 | 0.72 | 0.19 | 0.17 | 0.51 | 0.42 | 0.38 | 0.61 | 0.21 | 0.55 | 0.07 |

*Significant level $\alpha_P = 0.0036$.

5. User Study Evaluation Results

5.1 PRIME Evaluation and Comparison Results

Figure 5:
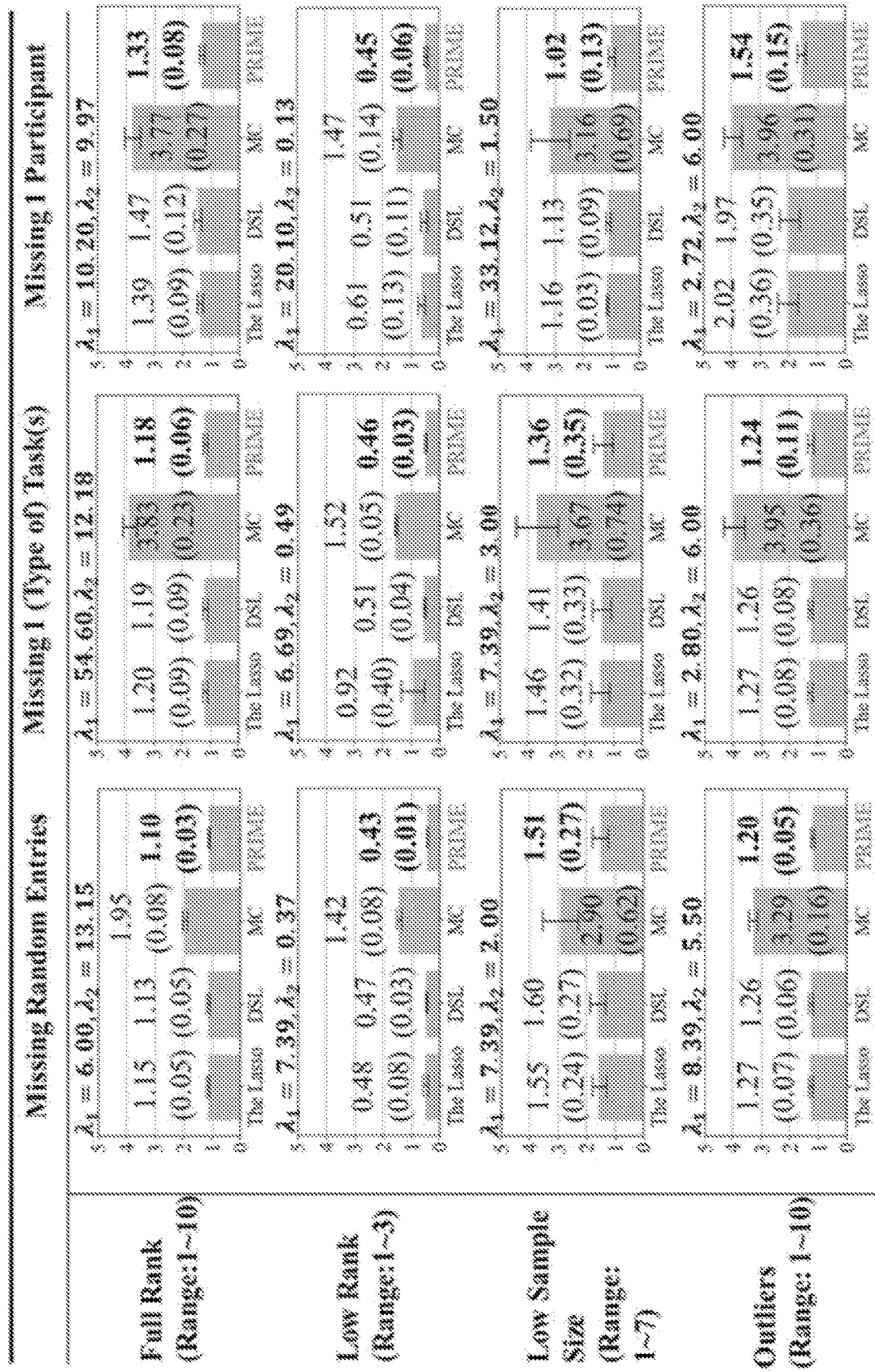
FIG. 5 is an illustration of results of the recommender system for four statistical cases in different scenarios, according to one embodiment described herein.

The benchmarking results for four statistical cases under three scenarios are graphically presented in FIG. 5. The blue bars reflect the average RMSEs over CV folds, and error bars represent the standard errors (SEs) of the RMSEs over CV folds. The selected tuning parameters were $\lambda_1$ for low-rank penalty and $\lambda_2$ for sparse coefficients penalty. The average converging time is 0.058 s (SD=0.020) on a Lenovo® T460p laptop with four i7-6820 cores. Therefore, PRIME can support fast recommendations.

The hypothesis testing results per task and per participant are summarized in Table 6 and Table 7, respectively. By adopting Bonferroni correction to $$\alpha_T = \frac{0.05}{11} = 0.0045$$

5.2 Variable Selection Results

As for variable selection results, PRIME selects significant features automatically as an equivalent approach to widely adopted statistical tests. As an example, Table 8 lists the consistently selected significant features in all 10 folds for full rank case under arbitrarily empty entries scenario. The consistency of feature selection over 10 CV folds indicates the level of confidence to identify the significance of features.

6. Discussion

We innovated The various embodiments of the PRIME modeling framework enable a personalized recommender system adaptive to user states and tasks. This research makes the following contributions:

1. The PRIME modeling framework can effectively support fast adaptive visualization in consideration of user states (i.e., real-time physiological measures) and contexts;
2. PRIME achieves accurate personalized recommendation of visualizations by quantifying implicit and explicit similarities to identify individual differences, especially for new users or new contexts;

3. PRIME reduces the sample size requirements (i.e., number of participants) in building adaptive visualization or personalized recommendation.

TABLE 8

Consistently selected significant freatures for full rank case under arbitrarily empty entries scenario.

| Data | Variables # | Channels | Bands | Features |
| --- | --- | --- | --- | --- |
| EEG signals | 21 | ECG | Delta | kurtosis |
| | 80 | Poz | Alpha | wavelet entropy |
| | 136 | Fz | Beta | skewness |
| | 156 | Cz | Delta | SD |
| | 163 | Cz | Theta | curve length |
| | 165 | Cz | Theta | skewness |
| | 174 | Cz | Alpha | skewness |
| | 183 | Cz | Beta | skewness |
| | 201 | C3 | Delta | skewness |
| | 202 | C3 | Delt | entropy |
| | 219 | C3 | Alpha | skewness |
| | 269 | C4 | Beta | wavelet entropy |
| | 278 | C4 | Gamma | wavelet entropy |
| | 293 | F3 | Delta | SD |
| | 324 | F3 | Gamma | nonlinear energy |
| | 329 | F3 | Gamma | SD |
| | 368 | F4 | Gamma | SD |
| | 395 | P3 | Alpha | wavelet entropy |
| | 399 | P3 | Alpha | skewness |
| | 426 | P4 | Delta | skewness |
| | 453 | P4 | Beta | skewness |
| | 460 | P4 | Gamma | curve length |

| Data | Variables # | Features |
| --- | --- | --- |
| Eye movements | 1 | counts of frequent graphs |
| | 3 | SD of length of frequent subgraphs |
| | 12 | mean of frequent subgraphs |
| | 14 | SD of frequent subgraphs |
| | 467 | mean of distance |
| | 468 | variance of distance |
| User input logs | 474 | variance of mouse moving over/out duration |
| | 475 | task duration |

6.1 Advancing Adaptive Visualization

In the testing phase, the PRIME model yields significantly lower RMSEs and SEs comparing the recommendation results against all three other benchmark models (FIG. 5). That is, PRIME yielded the highest recommendation accuracy (i.e., lowest RMSEs) for existing participants, new tasks and new participants in predicting the perceived task complexities in high computation speed (i.e., 0.058 s±0.02 s). PRIME also had the most stable recommendations (i.e., lowest SEs). Further, the hypothesis testing results in Table 6 and 7 show no significant difference between the recommended visualization designs and the truly preferred visualization designs in terms of different tasks and different users. Therefore, PRIME is trustworthy to serve as the adaptation manager for adaptive visualization system.

The accurate and consistent results can be attributed to the decomposition of Y into low-rank matrix R estimated by matrix completion and the penalized linear regression $\mathcal{A}$ (X$\beta$). Namely, low-rank structure in R quantifies the implicit similarities which indicate the consistency in users' ratings of recommendation scores after eliminating the effects of individual differences by using linear regression term X$\beta$ to quantify explicit similarities contained in covariates 133. Implicit and explicit similarities can jointly contribute to improving recommendation accuracy since they quantify individual differences from different aspects. However, FIG. 5 also illustrates that the matrix completion alone cannot support accurate recommendation for new participants or new tasks (i.e., cold-start) because the algorithm would end up with meaningless recommendation scores (i.e., all zeros), which are evidenced by high RMSEs. The Lasso regression can capture the significant features in covariates 133 but cannot quantify the similarities among the existing recommendation ratings, hence providing lower recommendation accuracy than PRIME. Therefore, the integration of implicit and explicit similarities significantly increases the amount of information that contributes to enhancing the recommendation accuracy. Tuning parameters s and t in PRIME model can be used to infer the influence of implicit and explicit similarities, respectively. Specifically, in Equation (2), PRIME becomes the Lasso regression when s=0, and becomes the matrix completion when t=0. Therefore, small tuning parameter s can be inferred as minimal implicit similarity in existing recommendation ratings, while small tuning parameter t corresponds to the minimal explicit similarity. Through analyzing the tuning parameters s and t (or alternatively $1/\lambda_1$ and $1/\lambda_2$), researchers can use PRIME to compare individual differences represented by the implicit and explicit similarities. In FIG. 5, when comparing $\lambda_1$ and $\lambda_2$ in three scenarios for full rank case, it can be observed that $\lambda_1<\lambda_2$ (i.e., s>t) for missing random entries, and $\lambda_1>\lambda_2$ (i.e., s<t) for two cold-start scenarios. This indicates that the implicit similarity contributes more to recommendation accuracy for missing random entries, while explicit similarity help resolve the cold-start problem, which is well aligned with the analysis in Section 2.2.

PRIME shows the most significant advantage in the low-rank cases against the three benchmark models (lowest RMSEs and lowest SEs; see FIG. 5) when individual differences are low. For matrix completion problems, lower ranks reflect more similarities in the recommendation scores. Therefore, the advantage of PRIME for low-rank case over regression approaches can be attributed to the ability in mining additional information from the entire matrix of perceived complexity ratings even when some ratings are missing. In other words, PRIME is expected to achieve best performance when different users share similar preferences for different tasks (i.e., implicit similarity). This finding indicates that the clustering users according to their preferences may significantly help increase the recommendation accuracy and reliability.

6.2 PRIME for New Users or New Task

PRIME is expected to provide acceptable recommendation for new users or new tasks because of the integration of linear regression and matrix completion. Specifically, the regularized linear regression term maximizes the explicit similarity information from covariates 133 while the matrix completion term provides inference on the implicit similarity based on the regression term. The matrix completion solvers, which have been widely adopted to build recommendation models, cannot recover any low-rank matrix if the sampling set misses an entire column (i.e., new task) or row (i.e., new user) of the response matrix which contains the recommendation scores. This can present a major practical problem because accurate recommendations for new users and new tasks may determine the future usages of the recommender systems. Comparing the accuracies and stabilities of four models under three scenarios, PRIME significantly outperforms the two regression approaches and the matrix completion method, especially in missing-one-task and missing-one-participant scenarios. These results show an advantage of PRIME in recommending visualizations to existing users for a new task, and to a new user on existing tasks.

6.3 PRIME for Limited Sample Sizes

PRIME yields the best performance for the case with low sample sizes under all three scenarios. For low sample size case, the size of the response matrix Y is reduced from 14×33=462 to 4×5=20; number of participants is reduced from 14 to 4; and the number of tasks is reduced from 33 to 5. Considering the historical recommendation scores (i.e., known scores in Y), the case with smallest sample size only includes 16, 16, and 15 samples for three scenarios, respectively. FIG. 5 shows that the PRIME can still provide acceptable recommendation accuracy comparing to benchmark models. The superior performance may be due to the prevention of overfitting in the regularized linear regressions term of PRIME. Specifically, PRIME automatically select fewer significant features in response to smaller sample sizes to ensure sufficient degree of freedom in the linear regression, thereby providing robust prediction for unknown recommendation scores and making recommendations with acceptable RMSEs. In practice, when sample size is relatively limited with respect to number of features, linear regression model typically overfits due to lacking degree of freedom, and thus cannot consistently identify significant features. PRIME manages this potential overfitting issue by automatically selecting statistically significant features instead of performing statistical tests on one over another. Therefore, PRIME saves significant efforts in statistical testing by providing feature selections, i.e., selecting statistically significant features. Hence, PRIME can reduce the sample size requirements in research studies for adaptive systems.

6.4 PRIME for Variable Selection

As for PRIME for variable selection, PRIME provides an automatic and stable feature selection functionality, which can be used for identifying significant covariates 133. The feature selection results (Table 8) shows good consistency with the authors' earlier work. By adopting the penalized linear regression to quantify the explicit similarities measured by covariates 133, PRIME can recommend visualization designs and select the significant features concurrently. Table 8 shows the significant predictors from EEG signals, eye movements, and user input logs providing incremental predictive values.

Four new FSM-related eye movement features were selected as significant predictors in all CV folds, implying that FSM is suitable for extracting common features from the eye gaze data from multiple users. Not all features from FSM were significant since the feature extraction from FSM adopted 15 different summary statistics to evaluate the capability in feature selection. A common linear regression model using only four significant features have the same performance as the penalized linear regression with all 15 features since the coefficients for insignificant variables are automatically set to be zero. The significance of selected and stable (i.e., features that are consistently selected in all CV folds) FSM-related features can reflect participants' different preferences for different layouts of visualization designs and individual scanning paths according to FIGS. 3, 5 and the discussion in Section 4.2.1.

The selected features from user input logs reflect the participants' attempts to performing the tasks and their performance. Specifically, the selected significant feature of "variance of mouse moving over/out durations" reflects the participants' visual search strategy of using the mouse to direct their attention, which is significantly correlated with their recommendation scores towards different visualization designs.

The feature selection capability of PRIME can reduce the efforts of researchers and practitioners typically spent in extracting and identifying meaningful features from various sensor signals and survey results. By following the application procedure described in Appendix A.1, a set of significant features will be automatically selected after successfully training the PRIME model. Therefore, PRIME can serve as a powerful tool for efficiently discovering the significant variables from large candidate set, especially in the era of wearable devices (e.g., the AR and VR headsets, eye trackers, and armbands, etc.).

6.5 Applications of PRIME

As for applications of PRIME, PRIME as a general modeling framework can be applied to multiple domains. PRIME can serve as an adaptive manager to suggest the contents and user interface designs with respect users' states and the contexts for interactive intelligent systems. In other words, PRIME enables context-aware and personalized intelligent systems. PRIME has the potential for adoption in E-commerce to recommend right products to the right user at the right time. Therefore, the recommended products not only can satisfy user preferences, but also change along with user mental states as well as the contexts. On the other hand, PRIME can support data analysts in adapting ML models to the change of manufacturing processes according to their experiences and preferences. Specifically, PRIME can be extended to recommend the best ML methods considering both covariates 133 from input datasets and the covariates 133 from ML methods.

Automatically adapting visualization designs to users and contexts enables effective and efficient comprehension of large-volume and high dimensional datasets. However, the variety of complex visualizations can challenge the recommender systems to present the best visualization for different users in specific contexts (i.e., pre-defined tasks). This article presents a recommender system modeling framework called PRIME to advance adaptive systems in accounting for both user states and contexts. An evaluation user study illustrated that PRIME benefited from quantification of implicit and explicit similarities and outperformed the Lasso, DSL, and matrix-completion recommendation models, which only considered partial similarities. Implicit and explicit similarities contribute to the quantification of individual differences, so that PRIME is able to provide personalized recommendations for adaptive visualization. PRIME also demonstrated an advantage in reduced sample size requirements in achieving satisfactory recommendation performance. Finally, PRIME automatically selects significant features that are consistent with research findings in the literature. Thus, PRIME advances research on adaptive visualization and presents potential applications for consumer products and industrial systems.

Figure 6:
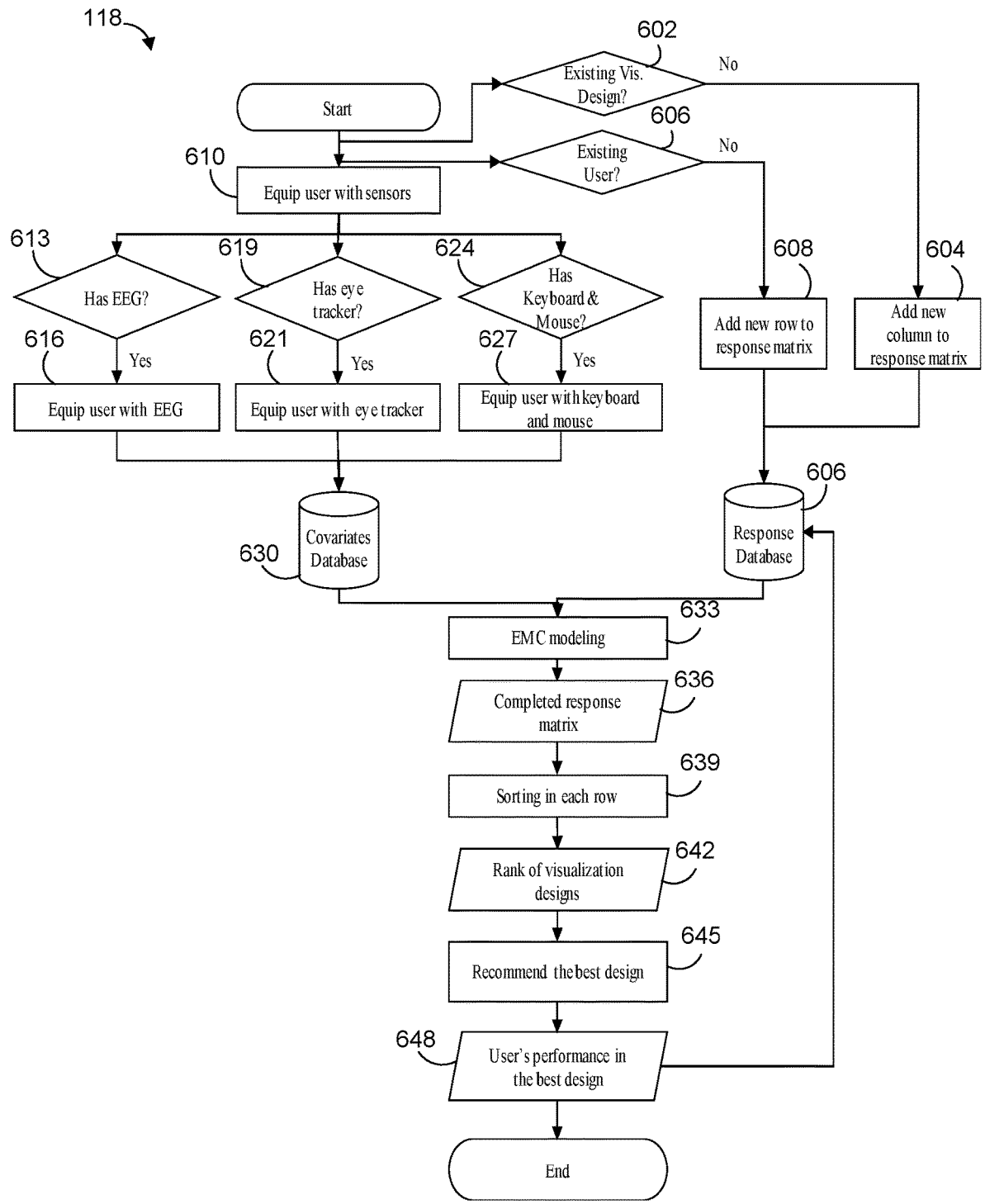
FIG. 6 is a flowchart illustrating one example of functionality implemented as portions of recommendation service executed in a computing environment according to various embodiments of the present disclosure.

With reference to FIG. 6, shown is a flowchart that provides one example of the operation of a portion of the recommendation service 118 according to various embodiments. It is understood that the flowchart of FIG. 6 provides merely an example of the many different types of functional arrangements that may be employed to implement the operation of the portion of the recommendation service 118 as described herein. As an alternative, the flowchart of FIG. 6 may be viewed as depicting an example of elements of a method implemented in the computing environment 103 (FIG. 8) according to one or more embodiments. Additionally, in some embodiments, the flowchart of FIG. 6 can be executed by the recommender application 134 in the client device 109 in part or in its entirety. Further, in some instances, a portion of FIG. 6 is executed by the recommendation service 118 and a portion can be executed by the recommender application 134.

In box 602, the recommendation service 118 can evaluate whether present user interface 135 on the display 130 is an existing visualization design 128 or a new visualization design 128. If the recommendation service 118 identifies the present user interface 135 has a new visualization design 128, then the recommendation service 118 proceeds to box 604. If the recommendation service 118 identifies the present user interface 135 as an existing visualization design 128, then the recommendation service 118 proceeds to box 606.

In box 606, the recommendation service 118 can determine whether the present user is an existing user or a new user. In some embodiments, the recommendation service 118 can check with the user is associated with a user identifier 121. For example, the user may be identified based at least in part on user credential (e.g., username, account number, token, etc.). If the user is new, then the recommendation service 118 can proceed to box 608. If the user is an existing user, then the recommendation service 118 can proceed to box 610.

In box 604, the recommendation service 118 can add a new column in the sparse response matrix 127 for the new visualization design 128 on the display 130. In some embodiments, the entries of recommendation scores 138 for the new column can each be set to zero. Alternatively, in some embodiments, a new row can be added to the sparse response matrix 127 for a new visualization design 128. Then, the recommendation service 118 can proceed to box 606. At box 606, the recommendation service 118 can store the new visualization design 128 in the data store 115 for the sparse response matrix 127. Then, in some embodiments, the recommendation service 118 can proceed to box 610.

In box 608, the recommendation service 118 can add a new row in the sparse response matrix 127 for the new user. In some embodiments, the entries of recommendation scores 138 for the new row can each be set to zero. Alternatively, in some embodiments, a new column can be added to the sparse response matrix 127 for the new user. Then, the recommendation service 118 can proceed to box 606. At box 606, the recommendation service 118 can store in the data store 115 a new user identifier 121 for the new user. Then, in some embodiments, the recommendation service 118 can proceed to box 610.

In box 610, the recommendation service 118 can determine to equip the user with sensor devices 109. In some embodiments, the recommendation service 118 can detect the sensor devices 109 that are being used by the user. In some implementations, the recommendation service 118 can activate one or more selected sensor devices 109. The recommendation service 118 can proceed to box 613, 619, or box 624.

In box 613, the recommendation service 118 can determine whether the user has an electroencephalography (EEG) device. If yes, the recommendation service 118 can proceed to box 616 for equipping the user with the EEG device. In some embodiments, the EEG device can be activated in order for the recommendation service 118 to receive EEG measurement data (e.g., covariates 133).

In box 619, the recommendation service 118 can determine whether the user has an eye tracker device. In some embodiments, the eye tracker device can include a camera for monitoring the eye of the user. The camera can be attached to a monitor, to an eye glass frame, and other suitable locations. If yes, the recommendation 118 can proceed to box 621 for equipping the user with the eye tracker device. In some embodiments, the eye tracker device can be activated in order for the recommendation service 118 to receive eye tracking measurement data (e.g., covariates 133).

In box 624, the recommendation service 118 can determine whether the client device 106 has a keyboard and/or a mouse. If yes, the recommendation 118 can proceed to box 627 for configuring the keyboard and/or mouse to communicate with the recommendation service 118 (e.g., covariates 133).

In box 630, the recommendation service 118 can receive covariates 133 from one or more sensor devices 109 that have been configured, such as EEG, the eye tracker, computer keyboard, computer mouse, and other suitable sensor devices 109. The covariates 133 can be collected or measured while the user is viewing a visualization design 128 on the display 130. The covariates 133 can be used to generate to feature matrix 124. The feature matrix 124 can be generated by using various forms of feature extractions on the covariates 133.

In box 606, the sparse response matrix 127 can be retrieved from the data store 115. The sparse response matrix 127 can be defined as $Y \in \mathbb{R}^{m \times n}$ where m is the number of users, n is the number of context types (e.g., task, visualization design, environmental condition, etc.); each row and each column correspond to a user and a type of context, respectively; and each entry of the sparse response matrix 127 is the recommendation score 138 (e.g., perceived task complexity, preference score, cognitive workload, etc.) for the corresponding context.

In box 633, the recommendation service 118 can involve extend matrix completion modeling. The modeling can include training one or more machine learning models based at least in part on the covariates and the sparse response matrix 127. The trained machine learning models can be used by the recommendation service 118 in the computing environment 103 or they can be used by the recommender application 134 in the client device 106.

In box 636, the recommendation service 118 can complete the sparse response matrix 127. The trained machine learning models can be used to predict or generate recommendation scores 138 for empty entries in the sparse response matrix 127.

In box 639, the recommendation service 118 can perform sorting in each row of the sparse response matrix 127. In one non-limiting example, the sparse response matrix 127 can be a matrix in which each row represents a unique user and each column can represent a context (e.g., a visualization design 128). For a particular user, the recommendation service 118 can select the row associated with the user and sort the row according to the entries of the recommendation scores 138.

In box 642, the recommendation service 118 can rank the visualization designs 128 sorted in the sparse response matrix 127. The visualization designs 128 can be ranked according to the recommendation scores 138 stored in the sparse response matrix 127. For example, for the user's row, the column with the highest recommendation score 138 can be selected. The column with the highest recommendation score 138 is associated with a particular context, such as a particular visualization design 128.

In box 645, the recommendation service 118 can select the best visualization design 128 based at least in part on the ranking. In some examples, the best visualization design 128 is selected because it has the highest recommendation score 138 in the sparse response matrix 127. For example, in the user's row, the column with the highest recommendation score 138 can be selected. The selected column can be linked to a particular visualization design 128.

In box 648, the recommendation service 118 can display the selected best visualization design 128 on the display 130. The recommendation service 118 can record the user performance while the user is viewing the selected visualization design 128. The user performance can be stored in the data store 115 for the sparse response matrix 127. Then, the recommendation service 118 can proceed to the end.

Figure 7:
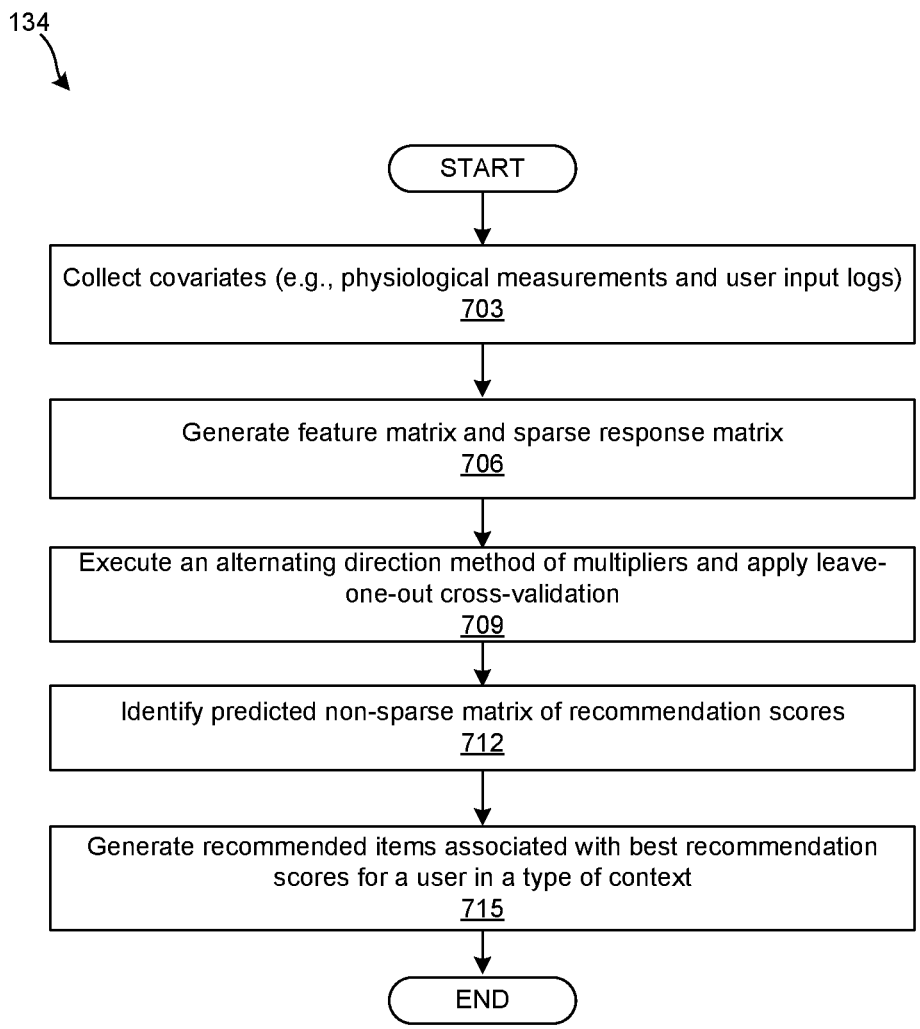
FIG. 7 is a flowchart illustrating one example of functionality implemented as portions of recommendation service executed in a computing environment according to various embodiments of the present disclosure.

With reference to FIG. 7, shown is a flowchart that provides example of the operation of a portion of the recommender application 134 according to various embodiments. It is understood that the flowchart of FIG. 7 provides merely an example of the many different types of functional arrangements that may be employed to implement the operation of the portion of the recommender application 134 as described herein. As an alternative, the flowchart of FIG. 7 may be viewed as depicting an example of elements of a method implemented in the networked environment 100 according to one or more embodiments. Additionally, in some embodiments, the flowchart of FIG. 6 can be executed by the recommendation service 118 in the computing environment 103 in part or in its entirety. Further, in some instances, a portion of FIG. 7 is executed by the recommendation service 118 and a portion can be executed by the recommender application 134.

Beginning with box 703, the recommender application 134 can receive covariates 133 associated with various users. The covariates 133 can be received from or more the sensor devices 109. The sensor devices 109 can measure a physiological signal (e.g., a wearable sensor or a camera) of a user viewing the user interface 135. In some instances, the sensor devices 109 can provide the covariates 133 to the client device 106. In some examples, as the quantity of sensor devices 109 increases, the accuracy for generating a personalize visualization (e.g., user interface 135, user-specific interface 141, user-specific content 145) can be improve. For example, a user may be situated in a workplace environment that includes a first sensor device 109 and a second sensor device 109. The first sensor device 109 can be an EEG device that is worn by the user and the second sensor device 109 can be a camera for tracking the eye gaze pattern of the user.

In box 706, the recommender application 134 can generate a feature matrix 124 and a sparse response matrix 127 based at least in part on the covariates 133. The sparse response matrix 127 can comprise a plurality of rows each represented by one of a plurality of users and a plurality of columns each represented by one of a plurality of tasks.

In box 709, the recommender application 134 can generate an output of an alternating direction method of multiplier (ADMM) based at least in part on the sparse response matrix and the feature matrix 124. The output of the ADMM comprises at least one of a learned coefficient, a low-rank matrix, and a completed matrix.

In box 712, the recommendation service 118 can identify a plurality of recommendation scores 138 for a predicted non-sparse matrix based at least in part on the output of the ADMM.

In box 715, the recommender application 134 can generate a recommended item for a user based at least in part on the plurality of recommendation scores 138 and a context associated with the user. The recommended item can refer personalized visualizations, such as user-specific interface 141 (e.g., a personalized user interface layout) and user-specific content 145 (e.g., a personalized content selected). Thus, the personalized visualizations are displayed in the user interface 135 of the client device 106. In some examples, the personalized visualizations are displayed in real-time or substantially real-time based on the covariates 133 from one or more sensor devices 109.

Figure 8:
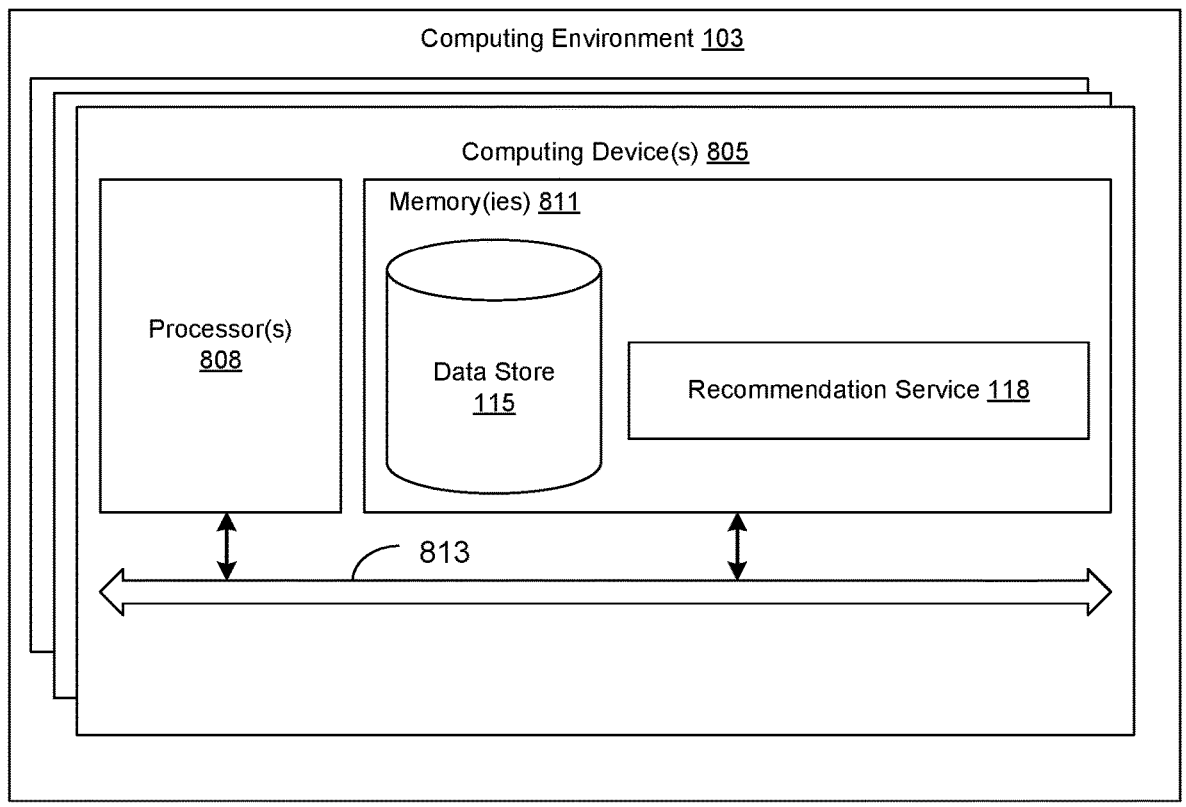
FIG. 8 is a schematic block diagram that provides one example illustration of a computing environment employed for executing the recommendation application of FIGS. 6 and 7 according to various embodiments of the present disclosure.

With reference to FIG. 8, shown is a schematic block diagram of the computing environment 103 according to an embodiment of the present disclosure. The computing environment 103 includes one or more computing devices 805. Each computing device 805 includes at least one processor circuit, for example, having a processor 808 and a memory 811, both of which are coupled to a local interface 812. To this end, each computing device 805 may comprise, for example, at least one server computer or like device. The local interface 812 may comprise, for example, a data bus with an accompanying address/control bus or other bus structure as can be appreciated.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
    receiving, via a computing device, a plurality of covariates associated with a plurality of users that have viewed a visualization design on a client device, the plurality of covariates being representative of physiological signals of the plurality of users collected from a plurality of different sensor devices;
    generating, via the computing device, a feature matrix of extracted features based at least in part on the plurality of covariates, the extracted features being extracted from the physiological signals of the plurality of users collected from a plurality of different sensor devices;
    identifying, via the computing device, a sparse response matrix that represents the plurality of users and a plurality of contexts, the sparse response matrix comprising a plurality of unknown scores and a plurality of recommendation scores;
    generating, via the computing device, an output of an alternating direction method of multipliers (ADMM) optimization approach based at least in part on the sparse response matrix and the feature matrix of extracted features from the physiological signals of the plurality of users, the output comprising a response matrix that includes a plurality of predicted recommendation scores for the plurality of unknown scores; and
    generating, via the computing device, a recommended item for a user based at least in part on the plurality of recommendation scores and the predicted recommendation scores associated with the user in the response matrix.

2. The method of claim 1, wherein the output of the ADMM comprises a completed response matrix.

3. The method of claim 1, wherein the physiological signals comprise a plurality of different physiological signals from a plurality of different wearable sensors and from a camera.

4. The method of claim 1, wherein the physiological signals comprise an electroencephalogram signal, an eye gaze pattern, and a heart rate.

5. The method of claim 1, wherein at least one feature in the feature matrix is generated by using a frequent subgraph mining analysis on an eye gaze pattern.

6. The method of claim 1, wherein the sparse response matrix comprises a plurality of rows each represented by one of the plurality of users and a plurality of columns each represented by one of a plurality of tasks.

7. The method of claim 1, wherein a size of the feature matrix is determined based on a quantity of the plurality of users, a quantity of context types, and a quantity of context types.

8. A system, comprising:
a plurality of different sensor devices;
a computing device; and
a memory to store a recommendation service that, when executed by the computing device, causes the computing device to at least:
receive a plurality of covariates, the plurality of covariates being representative of physiological signals of a plurality of users collected from the plurality of different sensor devices;
generate a feature matrix of extracted features based at least in part on the plurality of covariates, the extracted features being extracted from the physiological signals of the plurality of users collected from the plurality of different sensor devices;
identify a sparse response matrix that represents a plurality of users and a plurality of visualization designs, the sparse response matrix comprising a plurality of unknown scores and a plurality of recommendation scores;
generate an output of an alternating direction method of multipliers (ADMM) optimization approach based at least in part on the sparse response matrix and the feature matrix of extracted features from the physiological signals of the plurality of users, the output comprising a response matrix that includes a plurality of predicted recommendation scores for the plurality of unknown scores; and
generate a recommended visualization design for a user based at least in part on the plurality of recommendation scores and the predicted recommendation scores associated with the user in the response matrix.

9. The system of claim 8, wherein the output of the ADMM optimization approach comprises a completed response matrix.

10. The system of claim 8, wherein the physiological signals comprise a plurality of different physiological signals from a plurality of different wearable sensors and from a camera.

11. The system of claim 8, wherein the physiological signals comprise an electroencephalogram signal, an eye gaze pattern, and a heart rate.

12. The system of claim 8, wherein at least one feature in the feature matrix is generated by using a frequent subgraph mining analysis on an eye gaze pattern.

13. The system of claim 8, wherein the sparse response matrix comprises a plurality of rows each represented by one of the plurality of users and a plurality of columns each represented by one of a plurality of tasks.

14. The system of claim 8, wherein a size of the feature matrix is determined based on a quantity of the plurality of users, a quantity of context types, and a quantity of context types.

15. The system of claim 8, wherein a first sensor device among the plurality of different sensor devices measures a first set of the plurality of covariates, a second sensor device among the plurality of different sensor devices measures a second set of the plurality of covariates, and the first sensor device is a different type of device from the second sensor device.

16. A non-transitory computer-readable medium embodying a program executable in at least one computing device that, when executed by the at least one computing device, causes the at least one computing device to at least:
receive a plurality of covariates, the plurality of covariates being representative of physiological signals of a plurality of users collected from a plurality of different sensor devices;
generate a feature matrix of extracted features based at least in part on the plurality of covariates, the extracted features being extracted from the physiological signals of the plurality of users collected from the plurality of different sensor devices;
identify a sparse response matrix that represents a plurality of users and a plurality of visualization designs, the sparse response matrix comprising a plurality of unknown scores and a plurality of recommendation scores;
generate an output of an alternating direction method of multipliers (ADMM) optimization approach based at least in part on the sparse response matrix and the feature matrix of extracted features from the physiological signals of the plurality of users, the output comprising a response matrix that includes a plurality of predicted recommendation scores for the plurality of unknown scores; and
generate a recommended visualization design for a user based at least in part on the plurality of recommendation scores and the predicted recommendation scores associated with the user in the response matrix.

17. The non-transitory computer-readable medium of claim 16, wherein the output of the ADMM optimization approach comprises a completed response matrix.

18. The non-transitory computer-readable medium of claim 16, wherein a first sensor device among the plurality of different sensor devices measures a first set of the plurality of covariates, a second sensor device among the plurality of different sensor devices measures a second set of the plurality of covariates, and the first sensor device is a different type of device from the second sensor device.

19. The non-transitory computer-readable medium of claim 16, wherein at least one feature in the feature matrix is generated by using a frequent subgraph mining analysis on an eye gaze pattern.

20. The non-transitory computer-readable medium of claim 16, wherein the sparse response matrix comprises a plurality of rows each represented by one of the plurality of users and a plurality of columns each represented by one of a plurality of visualization designs.

* * * * *